(12) United States Patent
Takeguchi et al.

(10) Patent No.: US 8,158,294 B2
(45) Date of Patent: Apr. 17, 2012

(54) FUEL CELL SYSTEM AND METHOD OF OPERATING FUEL CELL SYSTEM

(75) Inventors: Shinsuke Takeguchi, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 937 days.

(21) Appl. No.: 12/160,618

(22) PCT Filed: Jan. 12, 2007

(86) PCT No.: PCT/JP2007/050312
§ 371 (c)(1),
(2), (4) Date: Jul. 11, 2008

(87) PCT Pub. No.: WO2007/080958
PCT Pub. Date: Jul. 19, 2007

(65) Prior Publication Data
US 2010/0167146 A1    Jul. 1, 2010

(30) Foreign Application Priority Data
Jan. 13, 2006  (JP) ................................. 2006-006593

(51) Int. Cl.
H01M 8/04 (2006.01)
H01M 8/10 (2006.01)
H01M 8/24 (2006.01)
(52) U.S. Cl. ........................ 429/432; 429/434
(58) Field of Classification Search ............... 429/432, 429/434
See application file for complete search history.

(56) References Cited

U.S. PATENT DOCUMENTS

| 5,677,073 | A | 10/1997 | Kawatsu | |
|---|---|---|---|---|
| 2002/0041984 | A1* | 4/2002 | Chow et al. | 429/13 |
| 2003/0054211 | A1 | 3/2003 | Charlat | |
| 2003/0082433 | A1 | 5/2003 | Sano et al. | |
| 2003/0157392 | A1* | 8/2003 | Zhang et al. | 429/38 |
| 2004/0038114 | A1* | 2/2004 | Wariishi et al. | 429/38 |
| 2006/0035126 | A1* | 2/2006 | Kurrle et al. | 429/26 |

FOREIGN PATENT DOCUMENTS

| EP | 0 692 835 A2 | 1/1996 |
|---|---|---|
| JP | 2001-210341 | 8/2001 |
| JP | 2002-141086 | 5/2002 |
| JP | 2003-017105 | 1/2003 |
| JP | 2003-059515 | 2/2003 |
| JP | 2003-142133 | 5/2003 |
| JP | 2004-079431 | 3/2004 |
| WO | WO 02/41426 A1 | 5/2002 |

* cited by examiner

*Primary Examiner* — Gregg Cantelmo
(74) *Attorney, Agent, or Firm* — McDermott Will & Emery LLP

(57) ABSTRACT

Provided is a fuel cell system which is capable of suppressing deterioration in the performance and durability of a fuel cell stack or restoring deterioration in performance of the fuel cell stack. In addition, provided is a method of operating the fuel cell system. The fuel cell system includes a fuel cell stack in which a gas passage for an anode and a cathode and a heat transmission medium passage have a structure in which inlet-side regions of each of the passages substantially overlap with each other. Outlet-side regions of the anode gas passage, the cathode gas passage, and the heat transmission medium passage substantially overlap with each other as viewed from a direction in which the unit cells are stacked. The fuel cell system also includes at least one anode gas flow inverting device and a cathode gas flow inverting device.

16 Claims, 14 Drawing Sheets

FUEL CELL SYSTEM AND METHOD OF OPERATING FUEL CELL SYSTEM

RELATED APPLICATIONS

This application is the U.S. National Phase under 35 U.S.C. §371 of International Application No. PCT/JP2007/050312, filed on Jan. 12, 2007 which in turn claims the benefit of Japanese Application No. 2006-006593, filed on Jan. 13, 2006, the disclosures of which Applications are incorporated by reference herein.

TECHNICAL FIELD

The present invention relates to a fuel cell system and a method of operating the fuel cell system. More particularly, the present invention relates to a fuel cell system using a polymer electrolyte fuel cell and a method of operating the fuel cell system.

BACKGROUND ART

Plural kinds of fuel cells have been developed according to the type of electrolyte. In recent years, there has been a tendency that polymer electrolyte fuel cells (hereinafter referred to as PEFCs) are frequently used. The PEFC includes an MEA (Membrane-Electrode-Assembly) and has a configuration in which main surfaces on both sides of the MEA are exposed to an anode gas containing hydrogen and a cathode gas containing oxygen such as air and the anode gas and the cathode gas are caused to electrochemically react with each other, generating an electric power and heat. To be specific, the following electrochemical reactions occur. Thereby, hydrogen at the anode side is consumed and water is generated as a reaction product at the cathode side.

Anode; $H_2 \rightarrow 2H^+ + 2e^-$ (1)

Cathode; $2H^+ + (\frac{1}{2})O_2 + 2e^- \rightarrow H_2O$ (2)

The PEFC typically has, as a major body, a fuel cell stack (hereinafter referred to as a stack) formed by stacking unit cells (hereinafter referred to as cells). Typically, 10 to 200 cells are stacked and are sandwiched at both ends of the stacked cells between end plates such that a current collecting plate and an insulating plate are disposed between the associated cell and end plate, and the stacked cells are fastened from both ends by fastening bolts.

The cell has a structure in which the MEA is sandwiched between a pair of flat-plate shaped separator plates, to be precise, an anode separator plate and a cathode separator plate.

The MEA includes a polymer electrolyte membrane having hydrogen ion transmissivity for selectively transporting hydrogen ions, and a pair of electrodes stacked on both surfaces of the polymer electrolyte membrane, namely, an anode and a cathode. Thus, a pair of electrodes are formed on both main surfaces of the MEA. Each of these electrodes includes a catalyst layer comprised of electrically-conductive carbon powder as a major component carrying an electrocatalyst (e.g., metal catalyst such as platinum), and a gas diffusion layer (e.g., carbon paper which has been subjected to water-repellent treatment) which is formed outside the catalyst layer and has gas permeability and electron conductivity. Gas seal members and gaskets are disposed on peripheral regions of the MEA so as to sandwich the polymer electrolyte membrane therebetween. The seal members and the like serve to prevent leakage of the anode gas and the cathode gas flowing within the stack to outside and mixing between them.

The separator plate is made of an electrically-conductive material such as resin containing electrically-conductive carbon or metal and is electrically connected to the electrode of the MEA so as to serve as a part of an electric circuit. An anode gas passage and a cathode gas passage are respectively formed on the both surfaces of the MEA and are each configured to extend to connect an inlet and an outlet on each of the surfaces. Thereby, the anode gas and the cathode gas are supplied through the inlets to the anode and to the cathode, respectively, and generated water and surplus gases are carried away through the outlets to outside. These passages may be provided separately from the separator plates. Nonetheless, typically, the passage grooves are provided on the surfaces of the separator plates and the both surfaces of the MEA are sandwiched between the separator plates so as to be in contact with them. Thus, the separator plates serve to mechanically fasten the MEA, and to connect adjacent MEAs electrically in series.

The anode gas passage and the cathode gas passage are formed so that the entire electrode region of the MEA are exposed to the anode gas passage and the cathode gas passage. Typically, the passages have a serpentine shape.

In a state where the polymer electrolyte membrane is saturated with a moisture, the polymer electrolyte membrane has a lower specific resistance, and serves as electrolyte having hydrogen ion conductivity. For this reason, during the power generation operation of the PEFC, the anode gas and the cathode gas are humidified and supplied. During the power generation operation, hydrogen is oxidized, generating water as a reaction product in the cathode gas passage. The water in the humidified anode gas, the water in the humidified cathode gas, and the water generated through the reaction makes a moisture content of the polymer electrolyte membrane saturated, and are discharged outside the PEFC together with the surplus anode gas and the surplus cathode gas.

Since the electrochemical reaction in the cell is an exothermic reaction, it is necessary to cool the cell so that the inner surface of the cell has a catalytic activity temperature during the power generation operation of the PEFC. In a start-up operation of the PEFC, it is necessary to pre-heat the cell so that the inner surface of the cell has the catalytic activity temperature. In addition, a proper temperature control is required during the power generation operation of the PEFC. If the cell is insufficiently cooled, then the MEA rises in temperature, causing vaporization of the moisture from the polymer electrolyte membrane, so that the membrane becomes dried. As a result, deterioration of the polymer electrolyte membrane progresses, and durability of the cell deteriorates, or electric resistance of the polymer electrolyte membrane increases and thus an electric power output decreases, which is known. On the other hand, if the cell is cooled excessively, then the moisture in the reaction gases flowing in the gas passages is condensed, increasing the amount of water in a liquid state contained in the reaction gases. The water in the liquid state forms liquid droplets which adhere onto at least one of the anode gas passage grooves and the cathode gas passage grooves formed on the separator plates, because of surface tension. If the amount of the liquid droplets is significantly large, then the water adhering onto the interior of the passage grooves impede the flow of the gases, causing flooding to occur. As a result, a reaction area of the electrodes decreases, and performance of the PEFC deteriorates, for example, the electric output becomes unstable, which is known.

Furthermore, by efficiently utilizing the electrochemical reaction heat generated in the cell in outside, i.e., configuring a cogeneration system which includes the PEFC as a major part, heat efficiency of the PEFC can be improved.

For these reasons, a heat transmission medium passage is formed to extend to connect an inlet and an outlet between surfaces of the stacked cells of the PEFC stack to allow a heat transmission medium to flow between the surfaces of the stacked cells. The separator plates are made of a highly heat transmissible material. Typically, the separator plate which has increased in temperature due to the exothermic reaction is caused to exchange heat with the heat transmission medium. Passages for the heat transmission medium are typically formed by providing passage grooves on outer surfaces of the separator plates. Alternatively, another members may be provided between the stacked cells to form the passages.

Patent document 1 discloses a fuel cell system including a gas flow inverting means for inverting a flow of the gas supplied to the stack in such a manner that the gas is introduced from a gas outlet and is discharged from a gas inlet, and a control means for controlling the gas flow inverting means to temporarily invert the flow of the gas supplied to the fuel cell stack. The configuration disclosed in the patent document 1 is capable of suppressing the flooding in the interior of the stack and of preventing reduction of efficiency of the fuel cell system.

Patent document 2 discloses a method of operating the fuel cell for repeatedly inverting a flow direction of the cathode gas or a flow direction of the anode gas in the cell. In the patent document 2, because of such inversion, a current density becomes lower and the amount of generated water becomes smaller in a region where the current density was high and the amount of generated water was large, thereby suppressing an event that the cell gets wet due to the generated water and further preventing the wetting of the cell. This makes it possible to prevent occurrence of a problem that the cathode gas or the anode gas is not easily supplied to the electrode as the degree of the wetting progresses, and thereby the electrochemical reaction does not easily occur.

Patent document 3 discloses a technique for continuously changing a flow direction of a fluid flowing within the fuel cell. Patent document 3 describes that temporal stop of the flow of the fluid can be prevented and thereby reduction of the output of the fuel cell can be inhibited.

Patent document 1: Japanese Laid-Open Patent Application Publication No. 2001-210341
Patent document 2: Japanese Laid-Open Patent Application Publication No. 2003-59515
Patent document 3: Japanese Laid-Open Patent Application Publication No. 2004-79431

DISCLOSURE OF THE INVENTION

Problems to be Solved by the Invention

However, in the fuel cell systems disclosed in the patent documents 1 and 2, deteriorated performance of the stack can be restored to some extent, but there is a room for improvement.

In the technique disclosed in the patent document 3, since the outlets of the anode gas passage and the cathode gas passage are merely changed to another outlets, it is difficult to remove the water remaining in the vicinity of the outlet of the anode gas passage and in the vicinity of the outlet of the cathode gas passage, in contrast to the configuration in which the inlets and the outlets of the anode gas passage and the cathode gas passage are inverted. Therefore, there is a room for improvement in terms of restoration of performance of the stack. Furthermore, since the fluid within the fuel cell is changed continuously, two or more inlets and two or more outlets are necessary for the heat transmission medium passage, the anode gas passage and the cathode gas passage, i.e., twelve or more inlets and outlets in total are necessary, making the structure of the fuel cell special and intricate.

The present invention has been made to solve the above described problem. An object of the present invention is to provide a fuel cell system which is capable of well preventing deterioration of performance of a fuel cell stack or well restoring deteriorated performance of the fuel cell stack and of suppressing deterioration of durability of the fuel cell stack, and a method of operating the fuel cell system.

Means for Solving the Problem

To solve the above described problem, the present inventors have studied intensively and have found out that restoration of performance of the stack can be further improved by continuing the operation (hereinafter simply referred to as inverting operation) under the condition in which the flow direction(s) of the cathode gas and/or the anode gas are/is inverted. In has been estimated that water clogging in pore regions in the interior of the electrodes of the MEA is obviated to enable the electrochemical reaction to easily occur by continuing the inverting operation. However, it has also been found that by continuing the inverting operation, durability of the stack is likely to be deteriorated.

Accordingly, the present inventors estimated the phenomenon of the deterioration of durability of the stack which is associated with the continued inverting operation as follows.

Typically, the heat transmission medium passage, the anode gas passage and the cathode gas passage in the cells are formed such that their inlet-side regions substantially overlap with each other and their outlet-side regions substantially overlap with each other as viewed from a direction in which the cells are stacked. The outlet side is higher in temperature than at the inlet side in the heat transmission medium passage within the cell, because of heating due to heat generated through the electrochemical reaction, while the outlet side is higher in humidity in the cathode gas passage within the cell because of the water generated through the electrochemical reaction. Also, in the anode gas passage, hydrogen is reduced because of occurrence of the electrochemical reaction, or the generated water at the cathode gas passage side of the polymer electrolyte membrane becomes hydrated water and moves to the anode gas passage through the polymer electrolyte membrane, increasing a humidity relatively at the outlet side. Thus, the temperature and the humidity are increased at the outlet side of the cathode gas passage and at the outlet side of the anode gas passage. In addition, the temperature is higher at the outlet side in the heat transmission medium passage. A conventional stack is formed such that the inlet-side regions of the heat transmission medium passage, the anode gas passage and the cathode gas passage substantially overlap with each other and the outlet-side regions thereof substantially overlap with each other, as viewed from the direction in which the cells are stacked. Because of such a configuration, in the stack during the power generation operation, the temperature is higher in locations closer to the outlet of the anode gas passage and the outlet of the cathode gas passage, and a relative humidity is approximately 100% over the entire cathode gas passage and over the entire anode gas passage. As used herein, the term "inlet-side region" refers to a region including a passage region which is closer to the inlet than the outlet in the associated passage, and the term "outlet-side region" refers to a passage region which is closer to the outlet than the inlet in the associated passage.

If the flow direction(s) of the cathode gas and/or the anode gas are/is inverted, inlet location(s) of the cathode gas and/or the anode gas are/is more distant from an inlet location of the heat transmission medium and outlet location(s) of the cathode gas and/or the anode gas are/is more distant from an outlet location of the heat transmission medium, than those in an uninverted state. Thereby, in the region (inlet-side region) in the vicinity of the inlet(s) of the cathode gas and/or the anode gas in the uninverted state, the cathode gas and/or the anode gas with a higher temperature than that in the uninverted state flow(s), so that a relative humidity in this region becomes lower than that in the uninverted state. For this reason, an electric resistance of the polymer electrolyte membrane in the region where the relative humidity is low increases, causing deterioration of performance of the stack, if the inverting operation is continued. In addition, extension and contraction of the polymer electrolyte membrane takes place with a change in a moisture level of the polymer electrolyte membrane, and the polymer electrolyte membrane is damaged according to increase and decrease of a tensional force associated with the extension and contraction. If the damage to the polymer electrolyte membrane progresses, durability of the stack deteriorates.

It is thought that an output voltage may decrease for a moment when inverting the flow direction(s) of the cathode gas and/or the anode gas. The present inventors considered that such a decrease of the output voltage for a moment was able to be compensated by utilizing a back-up power supply such as a rechargeable battery in the fuel cell system.

Through the above described study, the present inventors conceived an invention described below to solve the above described problems.

A fuel cell system of the first invention of the present invention including unit cells each having an MEA, a pair of an anode separator plate and a cathode separator plate which are disposed to sandwich the MEA, an anode gas passage which is provided between the MEA and the anode separator plate to connect an anode gas inlet to an anode gas outlet, and a cathode gas passage which is provided between the MEA and the cathode separator plate to connect a cathode gas inlet to a cathode gas outlet; and a fuel cell stack having the unit cells stacked and being provided with a heat transmission medium passage which is provided between surfaces of the stacked unit cells to connect a heat transmission medium inlet to a heat transmission medium outlet; wherein the anode gas passage, the cathode gas passage, and the heat transmission medium passage have a structure in which inlet-side regions of the anode gas passage, the cathode gas passage, and the heat transmission medium passage substantially overlap with each other and outlet-side regions of the anode gas passage, the cathode gas passage, and the heat transmission medium passage substantially overlap with each other as viewed from a direction in which the unit cells are stacked, and the anode gas, the cathode gas, and the heat transmission medium are flowed in a forward direction from the anode gas inlet to the anode gas outlet in the anode gas passage, from the cathode gas inlet to the cathode gas outlet in the cathode gas passage, and from the heat transmission medium inlet to the heat transmission medium outlet in the heat transmission medium passage, respectively; comprises at least one of an anode gas flow inverting device for inverting a flow direction of the anode gas in the anode gas passage from the forward direction to a reverse direction which is opposite to the forward direction, and a cathode gas flow inverting device for inverting a flow direction of the cathode gas in the cathode gas passage from the forward direction to the reverse direction; a heat transmission medium flow inverting device for inverting a flow direction of the heat transmission medium in the heat transmission medium passage from the forward direction to the reverse direction; and a control system configured to control inversion of the heat transmission medium flow inverting device after controlling inversion of at least one of the anode gas flow inverting device and the cathode gas flow inverting device, and inversion of the heat transmission medium flow inverting device, according to deterioration of the fuel cell stack.

In such a configuration, the flow direction of the heat transmission medium, and the flow direction of at least one of the anode gas and the cathode gas are inverted according to deterioration of performance of the fuel cell stack, and the inlet-side regions and the outlet-side regions of these passages are inverted. To be specific, during the inverting operation, the inlet-side regions can be configured to substantially overlap with each other and the outlet-side regions can be configured to substantially overlap with each other as viewed from the direction in which the unit cells are stacked, as in during the forward direction operation. So, during the inverting operation, the relative humidity in the cathode gas passage and the anode gas passage can be made as in during the forward direction operation. Therefore, water clogging within the fuel cell stack can be well obviated while suppressing damage to the polymer electrolyte membrane of the fuel cell stack. As a result, deterioration of performance of the fuel cell stack can be well prevented or deteriorated performance thereof can be well restored. In addition, deterioration of durability of the fuel cell stack can be suppressed. In such a configuration, by inverting the flow direction(s) of the anode gas and/or the cathode gas without inverting the flow direction of the heat transmission medium, the anode gas and/or the cathode gas which contain(s) less moisture under the temperature condition which is substantially the same as that in the uninverted state are/is flowed, in the outlet-side region(s) of the anode gas passage and/or the cathode gas passage in the uninverted state. This makes it possible to obviate earlier the clogging state or the narrowing state in these regions due to moisture.

As used herein, the term "MEA" refers to an assembly of electrolyte and electrodes in which the anode and the cathode are respectively joined to the both surfaces of the polymer electrolyte membrane.

The fuel cell system of the second invention of the present invention may further comprise a voltage measuring device for measuring an output voltage of the fuel cell stack. The control system may be configured to control the inversion of at least one of the anode gas flow inverting device and the cathode gas flow inverting device, and the inversion of the heat transmission medium flow inverting device, based on the output voltage. In such a configuration, since the performance of the fuel cell stack is directly detected, switching of these inverting devices can be accurately carried out.

The fuel cell system of the third invention of the present invention may further comprise a time measuring device for measuring a power generation continuation time of the fuel cell stack. The control system may be configured to control the inversion of at least one of the anode gas flow inverting device and the cathode gas flow inverting device, and the inversion of the heat transmission medium flow inverting device, based on the power generation continuation time. In such a configuration, since switching of these inverting devices can be carried out to be preventive against deterioration of performance of the fuel cell stack, the fuel cell system is allowed to carry out the power generation operation more stably. In addition, the configuration of the fuel cell system of the present invention can be simplified.

The fuel cell system of the fourth invention of the present invention may further comprise a pressure measuring device for measuring a pressure loss in at least one of the anode gas in the anode gas passage and the cathode gas in the cathode gas passage. The control system may be configured to control the inversion of at least one of the anode gas flow inverting device and the cathode gas flow inverting device, and the inversion of the heat transmission medium flow inverting device, based on the pressure loss. In such a configuration, switching of each inverting device can be carried out accurately while simplifying the configuration of the fuel cell system of the present invention. As used herein, the term "pressure loss" refers to a pressure difference between two locations in the associated passage.

The fuel cell system of the seventh invention of the present invention may further comprise a voltage measuring device for measuring an output voltage of the fuel cell stack. The control system may be configured to control the inversion of the heat transmission medium flow inverting device based on the output voltage measured by the voltage measuring device, after controlling the inversion of at least one of the anode gas flow inverting device and the cathode gas flow inverting device.

In such a configuration, since performance of the fuel cell stack is directly detected, the clogging state or the narrowing state due to moisture in the anode gas passage and/or the cathode gas passage can be obviated appropriately.

In the fuel cell system of the eighth invention of the present invention, the control system may be configured to control the inversion of at least one of the anode gas flow inverting device and the cathode gas flow inverting device when the output voltage is lower than a first inversion reference voltage, and to control the inversion of the heat transmission medium flow inverting device when the output voltage is not lower than a second inversion reference voltage, after controlling the inversion of at least one of the anode gas flow inverting device and the cathode gas flow inverting device. The second inversion reference voltage may have a voltage value higher than a voltage value of the inversion reference voltage.

In such a configuration, the present invention can be practiced reliably.

The fuel cell system of the ninth invention of the present invention may further comprise a time measuring device. The control system may be configured to control the inversion of the heat transmission medium flow inverting device according to an elapsed time measured by the time measuring device, after controlling the inversion of at least one of the anode gas flow inverting device and the cathode gas flow inverting device.

Thereby, the configuration of the fuel cell system of the present invention can be simplified.

In the fuel cell system of the tenth invention of the present invention, a delay time that elapses from when the inversion of at least one of the anode gas flow inverting device and the cathode gas flow inverting device is controlled until the inversion of the heat transmission medium flow inverting device is controlled may be determined based on a dew point of the cathode gas, a temperature of the cathode gas passage, a flow rate of the cathode gas, and a volume of the cathode gas passage.

In such a configuration, the present invention can be practiced reliably.

The fuel cell system of the eleventh invention of the present invention may further comprise a pressure measuring device for measuring a pressure loss in at least one of the anode gas in the anode gas passage and the cathode gas in the cathode gas passage. The control system may be configured to control the inversion of the heat transmission medium flow inverting device based on the pressure loss measured by the pressure measuring device, after controlling the inversion of at least one of the anode gas flow inverting device and the cathode gas flow inverting device.

Thereby, the configuration of the fuel cell system of the present invention can be simplified. In addition, since the clogging state or the narrowing state due to moisture in the anode gas passage and/or the cathode gas passage can be obviated appropriately, the clogging state or the narrowing state due to moisture can be obviated appropriately.

In the fuel cell system of the twelfth invention of the present invention, the control system may be configured to control the inversion of at least one of the anode gas flow inverting device and the cathode gas flow inverting device, when the pressure loss is higher than a first inversion reference pressure, and to control the inversion of the heat transmission medium flow inverting device when the pressure loss is not higher than a second inversion reference pressure, after controlling the inversion of at least one of the anode gas flow inverting device and the cathode gas flow inverting device. The second inversion reference pressure may be lower than the first inversion reference pressure.

In such a configuration, the present invention can be practiced reliably.

A method of operating a fuel cell system, of a thirteenth invention of the present invention, including unit cells each having an MEA, a pair of an anode separator plate and a cathode separator plate which are disposed to sandwich the MEA, an anode gas passage which is provided between the MEA and the anode separator plate to connect an anode gas inlet to an anode gas outlet, and a cathode gas passage which is provided between the MEA and the cathode separator plate to connect a cathode gas inlet to a cathode gas outlet; and a fuel cell stack having the unit cells stacked and being provided with a heat transmission medium passage which is provided between surfaces of the stacked unit cells to connect a heat transmission medium inlet to a heat transmission medium outlet; wherein the anode gas passage, the cathode gas passage, and the heat transmission medium passage have a structure in which inlet-side regions of the anode gas passage, the cathode gas passage, and the heat transmission medium passage substantially overlap with each other and outlet-side regions of the anode gas passage, the cathode gas passage, and the heat transmission medium passage substantially overlap with each other as viewed from a direction in which the unit cells are stacked, and the anode gas, the cathode gas, and the heat transmission medium are flowed in a forward direction from the anode gas inlet to the anode gas outlet in the anode gas passage, from the cathode gas inlet to the cathode gas outlet in the cathode gas passage, and from the heat transmission medium inlet to the heat transmission medium outlet in the heat transmission medium passage, respectively; comprises a flow direction of the heat transmission medium in the heat transmission medium passage from the forward direction to a reverse direction which is opposite to the forward direction, after inverting at least one of a flow direction of the anode gas in the anode gas passage and a flow direction of the cathode gas in the cathode gas passage from the forward direction to the reverse direction, according to deterioration of performance of the fuel cell stack.

In such a configuration, the flow direction of the heat transmission medium, and the flow direction of at least one of the anode gas and the cathode gas are inverted according to deterioration of performance of the fuel cell stack, and the inlet-side regions and the outlet-side regions of these passages are inverted. To be specific, during the inverting operation, the inlet-side regions can be configured to substantially overlap with each other and the outlet-side regions can be configured to substantially overlap with each other as viewed from the direction in which the unit cells are stacked, as in during the forward direction operation. So, during the inverting operation, the relative humidity in the cathode gas passage and the anode gas passage can be made as in during the forward direction operation. Therefore, water clogging within the fuel cell stack can be well obviated while suppressing damage to the polymer electrolyte membrane of the fuel cell stack. As a result, deterioration of performance of the fuel cell stack can be well prevented or deteriorated performance thereof can be well restored. In addition, deterioration of durability of the fuel cell stack can be suppressed.

EFFECTS OF THE INVENTION

As should be appreciated from the above, the fuel cell system and the method of operating the fuel cell system of the present invention are able to well prevent deterioration of performance of the fuel cell stack, to well restore deteriorated performance thereof, and to suppress deterioration of durability of the fuel cell stack.

Figure 1:
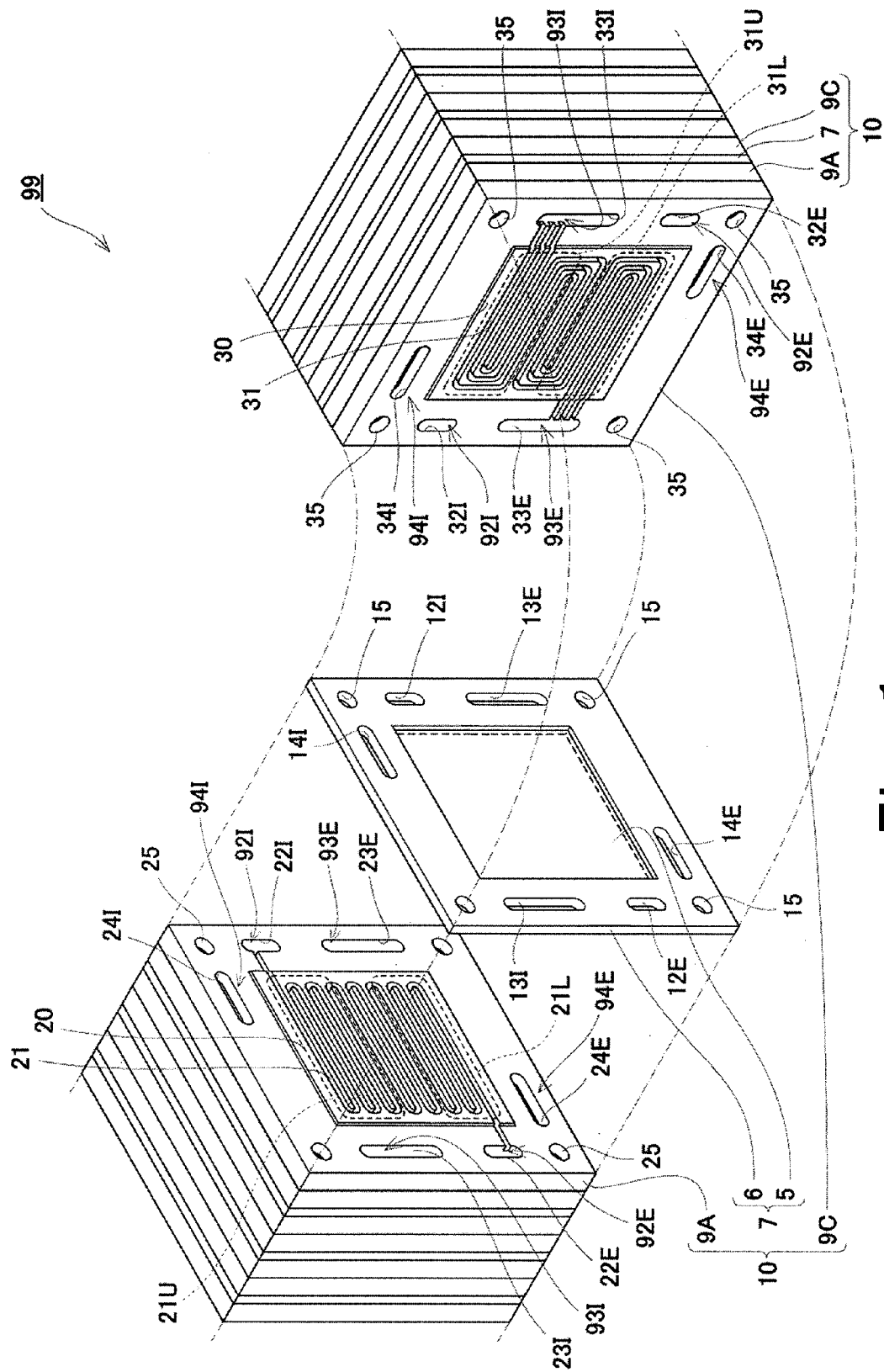
FIG. 1 is a partially exploded perspective view showing a stack structure of cells of a polymer electrolyte fuel cell and a stack according to a first embodiment of the present invention.

DESCRIPTION OF REFERENCE NUMERALS 5 membrane electrode assembly (MEA)
6 gasket
7 MEA member
9A anode separator
9c, 9CE cathode separator
10 cell
12I, 22I, 32I first anode gas manifold hole
12E, 22E, 32E second anode gas manifold hole
13I, 23I, 33I first cathode gas manifold hole
13E, 23E, 33E second cathode gas manifold hole
14I, 24I, 34I first heat transmission medium manifold hole
14E, 24E, 34E second heat transmission medium manifold hole
15, 25, 35, 55, 65 75 bolt hole
20, 30 MEA contact surface
21 anode gas passage groove
21A, 21B main passage groove
21C branch passage groove
21U inlet-side region
21L outlet-side region
31 cathode gas passage groove
31U inlet-side region
31L outlet-side region
26, 36 heat transmission medium passage groove
26U, 36U inlet-side region
26L, 36L outlet-side region
50, 51 current collecting plate
55 terminal
60, 61 insulating plate
70, 71 end plate
52I, 62I, 72I first anode gas flow hole
52E, 62E, 72E second anode gas flow hole
53I, 63I, 73I first cathode gas flow hole
53E, 63E, 73E second cathode gas flow hole
54I, 64I, 74I first heat transmission medium flow hole
54E, 64E, 74E second heat transmission medium flow hole
80 bolt
81 washer
82 nut
92I first anode gas manifold
92E second anode gas manifold
93I first cathode gas manifold
93E second cathode gas manifold
94I first heat transmission medium manifold
94E second heat transmission medium manifold
99 cell stack body
100 stack
102I first anode gas nozzle
102E second anode gas nozzle
103I first cathode gas nozzle
103E second cathode gas nozzle
104I first heat transmission medium nozzle
104E second heat transmission medium nozzle
112I first anode gas pipe
112E second anode gas pipe
113I first cathode gas pipe
113E second cathode gas pipe
114I first heat transmission medium pipe
114E second heat transmission medium pipe
122 anode gas flow inverting device
123 cathode gas flow inverting device
124 heat transmission medium flow inverting device
130 electric power output system
131 voltage meter
202I, 203E first port
202W, 203W three-way valve
202C, 203C, 202D, 203D branch portion
202J, 203J second port
202K, 203K third port
204, 205 branch passage
202V, 203V, 204V, 205V valve
300, 310, 320 control system 301 input device
302 storage unit
303 calculator
304 control unit
306 pressure meter
A forward direction state
B inverted state
S1 to S8, S201 to S203, S207, S301 to S304 step
T measured time
T0 inversion continuation time
Tstand inversion reference time
ΔT delay time
Vout output voltage
Vstand inversion reference voltage
V2 second inversion reference voltage
P pressure
Pstand inversion reference pressure
P2 second inversion reference pressure

BEST MODE FOR CARRYING OUT THE INVENTION

Hereinafter, best mode for carrying out the invention will be described with reference to the drawings.

(Embodiment 1)

FIG. 1 is a partially exploded perspective view showing a stack structure of cells of a polymer electrolyte fuel cell and a stack according to a first embodiment of the present invention.

As shown in FIG. 1, 100 cells (unit cells) 10 of a rectangular flat-plate-shape are stacked to form a cell stack body 99 in a rectangular parallelepiped shape in a main body of the polymer electrolyte fuel cell.

Each cell 10 has a structure in which a MEA member 7 is sandwiched between a pair of anode separator (anode separator plate) 9A of a flat-plate shape and cathode separator (cathode separator plate) 9C of a flat-plate shape (these are collectively referred to as separators).

First anode gas manifold holes 12I, 22I and 32I, second anode gas manifold holes 12E, 22E, and 32E, first cathode gas manifold holes 13I, 23I and 33I, second cathode gas manifold holes 13E, 23E, and 33E, first heat transmission medium manifold holes 14I, 24I and 34I, and second heat transmission medium manifold holes 14E, 24E, and 34E are formed in peripheral portions of the separators 9A and 9C and the MEA member 7 so as to penetrate main surfaces thereof. The first anode gas manifold holes 12I, 22I, and 32I are connected to each other in the cell stack body 99 to form a first anode gas manifold 92I, and the second anode gas manifold holes 12E, 22E, and 32E are connected to each other in the cell stack body 99 to form a second anode gas manifold 92E. In the same manner, the first cathode gas manifold holes 13I, 23I, and 33I are connected to each other in the cell stack body 99 to form a first cathode gas manifold 93I, and the second cathode gas manifold holes 13E, 23E, and 33E are connected to each other in the cell stack body 99 to form a second cathode gas manifold 93E. Furthermore, in the same manner, the first heat transmission medium manifold holes 14I, 24I and 34I are connected to each other in the cell stack body 99 to form a first heat transmission medium manifold 94I, and the second heat transmission medium manifold holes 14E, 24E and 34E are connected to each other in the cell stack body 99 to form a second heat transmission medium manifold 94E.

The MEA member 7 is structured such that a region of the polymer electrolyte membrane which extends in a peripheral region of the MEA 5 is sandwiched between a pair of gaskets 6 made of fluorocarbon rubber. So, the MEA 5 is exposed on both sides of center openings of the gaskets 6. The first anode gas manifold hole 12I, the second anode gas manifold hole 12E, the first cathode gas manifold hole 13I, the second cathode gas manifold hole 13E, the first heat transmission medium manifold hole 14I, and the second heat transmission medium manifold hole 14E are formed to penetrate the gasket 6.

The MEA 5 includes the polymer electrolyte membrane which is formed of an ion exchange membrane which is able to selectively transmit hydrogen ions, a pair of anode-side catalyst layer and cathode-side catalyst layer which are formed to sandwich the polymer electrolyte membrane and are made mainly of carbon powder carrying platinum-based metal catalyst, and a pair of anode-side gas diffusion layer and cathode-side gas diffusion layer which are disposed on outer surfaces of the pair of catalyst layers, respectively. The catalyst layers and the gas diffusion layers form electrodes. To be more specific, the MEA 5 includes the polymer electrolyte membrane, and a pair of electrodes stacked on center regions of both main surfaces thereof, namely, an anode and a cathode. Electrode surfaces are formed on the both main surfaces of the MEA 5.

The MEA 5 may be commercially available ones, or may be manufactured as follows, for example.

As the polymer electrolyte membrane, a commercially available product ((Nafion 112® membrane produced by Dupont Co. Ltd.)) made of perfluorocarbonsulfonic acid is used.

The catalyst layer is manufactured as follows. A catalyst body (50 wt % is Pt) produced by carrying platinum on Ketjen Black (Ketjen Black EC, particle diameter of 30 nm) manufactured by Ketjen Black International Co., Ltd)) which is a carbon powder is prepared. The catalyst body is mixed with perfluorocarbonsulfonic acid ionomer (5 mass % of Nafion dispersion liquid manufactured by Aldrich Co Ltd. in US) and the mixture is molded into the catalyst layer. Typically, the catalyst layer is molded to have a thickness of 10 to 20 μm.

The gas diffusion layer is manufactured as follows. A carbon non-woven fabric having pores, 80% or more of which have diameters of 20 to 70 μm, is used as a base material. For example, GF-20-E manufactured by Nippon Carbon Co. Ltd. is suitably used as the base material. Next, a water-repellent resin dispersion liquid in which water-repellent resin is dispersed in a solution containing a mixture of pure water and an interfacial active agent is prepared. For example, a PTFE dispersion liquid in which polytetrafluoroethylene (PTFE) is dispersed is suitably used. The base material is immersed in a water-repellent resin dispersion liquid and is thereafter calcined. For example, the base material may be introduced into a far-infrared dry furnace and may be calcined at 300° C. for 60 minutes. Then, a carbon black dispersion liquid in which carbon black is dispersed in a solution containing a mixture of pure water and an interfacial active agent is prepared. PTFE and water are added to the carbon black dispersion liquid and are kneaded, preparing a coating layer paint. The coating layer paint is applied to the calcined base material. The base material applied with the coating layer paint is calcined to form the gas diffusion layer. For example, the base material may be calcined at 300° C. for 2 hours by using a hot air drier. This allows the gas diffusion layer to have a porous structure having gas permeability and electron conductivity. As the interfacial active agent, Triton® X-100 is suitably used. The carbon black may be dispersed in the solution for about 3 hours by using a planetary mixer.

The gas diffusion layer and the catalyst layer are joined to both surfaces of a center region of the polymer electrolyte membrane by hot press, manufacturing the MEA 15.

The separators 9A and 9C are made of electrically-conductive material. The separators 9A and 9C are formed of graphite plates impregnated with phenol resin and have a flat-plate shape of about 150 mm square and a thickness of about 3 mm. A planar MEA contact surface 20 is formed on an inner surface of the anode separator 9A and is located so as to contact the MEA 5 of the MEA member 7. The MEA contact surface 20 is formed to have a step on the inner surface of the anode separator 9A so that the MEA contact surface 20 contacts one main surface of the MEA 5 when the MEA member 7 and the anode separator 9A are joined to each other. In the same manner, a planar MEA contact surface 30 is formed on an inner surface of the cathode separator 9C and is located so as to contact an opposite main surface of the MEA 5. The MEA contact surface 30 is formed to have a step on the inner surface of the cathode separator 9C so that the MEA contact surface 30 contacts the opposite main surface of the MEA 5 when the MEA member 7 and the cathode separator 9C are joined to each other. Thus, in the cell 10, since the anode separator 9A and the cathode separator 9C are joined to the MEA 5 so as to sandwich the MEA 5 from an obverse side and a reverse side, and are made of an electrically-conductive material, an electric energy generated in the MEA 5 can be taken out via the separators 9A and 9C.

On the inner surface of the anode separator 9A, an anode gas passage groove (anode gas passage) 21 is formed to connect the first anode gas manifold hole (inlet) 22I to the second anode gas manifold hole (outlet) 22E. The anode gas passage groove 21 is formed in a serpentine shape over a substantially entire surface of the MEA contact surface 20. For example, the anode gas passage groove 21 is formed by a single groove having a width of 2.0 mm and a depth of 1.0 mm.

In the same manner, on the inner surface of the cathode separator 9C, a cathode gas passage groove (cathode gas passage) 31 is formed to connect the first cathode gas manifold hole (inlet) 33I to the second cathode gas manifold hole (outlet) 33E. The cathode gas passage groove 31 is formed in a serpentine shape over a substantially entire surface of the MEA contact surface 30. For example, the cathode gas passage groove 31 is formed by three grooves which are arranged in parallel and have a width of 2.0 mm and a depth of 1.0 mm.

Thus, the anode gas passage 21 extending to connect the inlet 22I to the outlet 22E is formed between the MEA 5 and the anode separator 9A, while the cathode gas passage 31 extending to connect the inlet 33I to the outlet 33E is formed between the MEA 5 and the cathode separator 9C.

In the anode gas passage groove 21, an inlet-side region 21U is formed on the first anode gas manifold hole (inlet) 22I side, i.e., on an upper side in FIG. 1, and an outlet-side region 21L is formed on the second anode gas manifold hole (outlet) 22E side, i.e., on a lower side in FIG. 1. In the same manner, in the cathode gas passage groove 31, an inlet-side region 31U is formed on the first anode gas manifold hole (inlet) 33I side, i.e., on an upper side in FIG. 1, and an outlet-side region 31L is formed on the second anode gas manifold hole (outlet) 33E side, i.e., on a lower side in FIG. 1.

Figure 2:
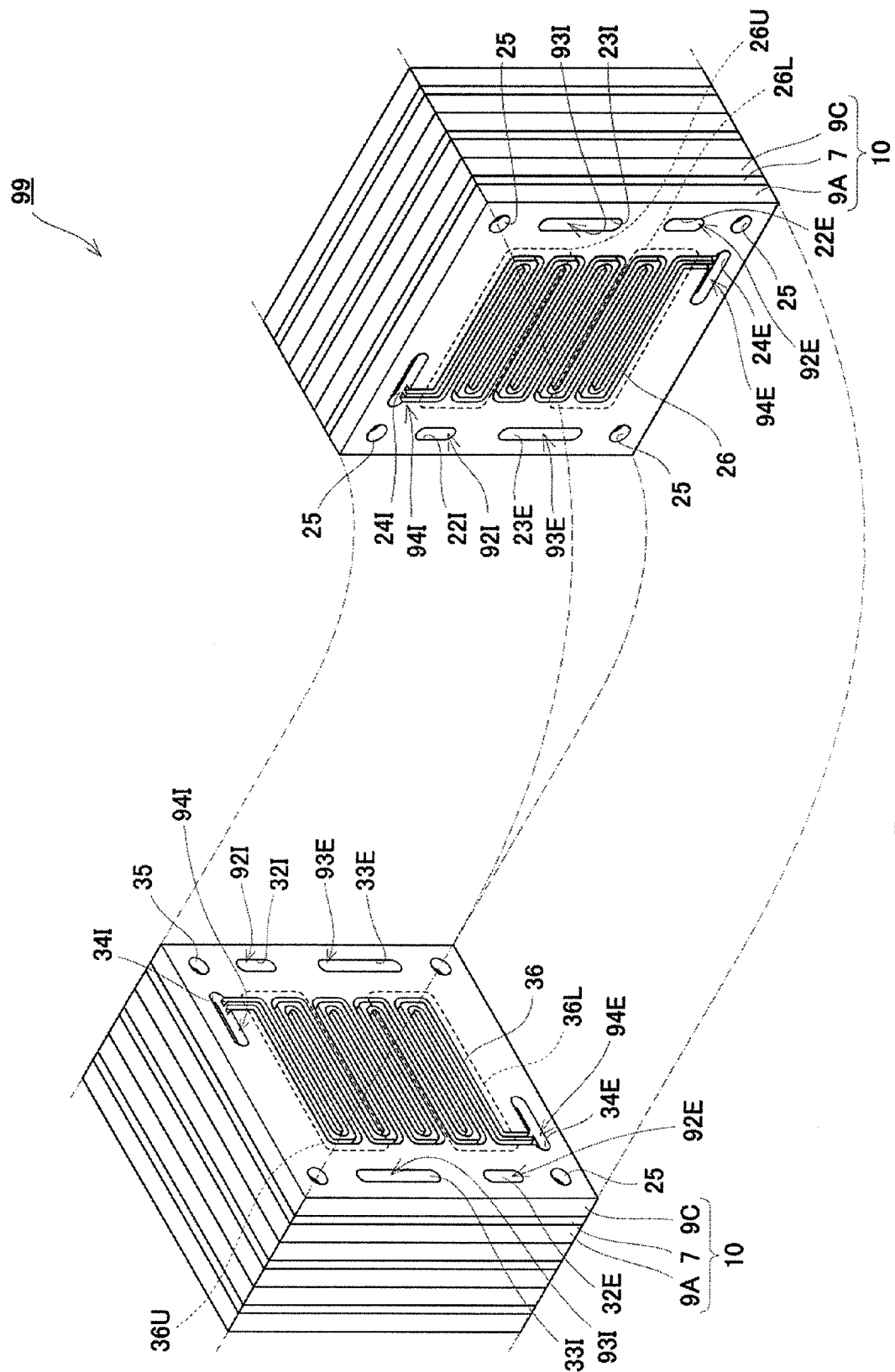
FIG. 2 is an exploded perspective view showing a stack structure of the cells of the stack of FIG. 1.

FIG. 2 is an exploded perspective view showing a stack structure of the cells of the stack of FIG. 1.

As shown in FIG. 2, on an outer surface of the anode separator 9A, a heat transmission medium passage groove (heat transmission medium passage) 26 is formed to connect the first heat transmission medium manifold hole (inlet) 24I to the second heat transmission medium manifold hole (outlet) 24E. The heat transmission medium passage groove 26 is formed in a serpentine shape over an entire surface of a back portion of the MEA contact surface 20. In the same manner, on an outer surface of the cathode separator 9C, a heat transmission medium passage groove (heat transmission medium passage) 36 is formed to connect the first heat transmission medium manifold hole (inlet) 34I to the second heat transmission medium manifold hole (outlet) 34E. The heat transmission medium passage groove 36 is formed in a serpentine shape over an entire surface of a back portion of the MEA contact surface 30. In the cell stack body 99, the heat transmission medium passage groove 26 and the heat transmission medium passage groove 36 are joined to each other. That is, the heat transmission medium passage groove 26 and the heat transmission medium passage groove 36 are symmetric with respect to a plane. Thus, in the state where the cells 10 are stacked, the heat transmission medium passages 26 and 36 are integral with each other, and the heat transmission medium passage 26 connecting the inlet 24I to the outlet 24E and the heat transmission medium passage 36 connecting the inlet 34I to the outlet 34E are formed between the surfaces of the stacked cells 10. Each of the heat transmission medium passage grooves 26 and 36 has a structure in which two grooves having a width of 2.0 mm and a depth of 1.0 mm are arranged in parallel.

Furthermore, inlet-side regions 26U and 36U are respectively formed on the first heat transmission medium manifold holes (inlets) 24I and 34I side, i.e., on an upper side in FIG. 2, and an outlet-side region 21L is formed on the second heat transmission medium manifold holes (outlets) 24E and 34E side, i.e., on a lower side in FIG. 2.

As shown in FIGS. 1 and 2, the inlet-side region 21U of the anode gas passage groove 21, the inlet-side region 31U of the cathode gas passage groove 31, and the inlet-side regions 26U and 36U of the heat transmission medium passage grooves 26 and 36 are located to sandwich therebetween the MEA 7 or the separators 9A and 9C and are arranged to substantially overlap with each other as viewed from the direction in which the cells 10 are stacked. Also, the outlet-side region 21L of the anode gas passage groove 21, the outlet-side region 31L of the cathode gas passage groove 31, and the outlet-side regions 26L and 36L of the heat transmission medium passage grooves 26 and 36 are arranged to substantially overlap with each other as viewed from the direction in which the cells 10 are stacked.

The anode gas passage groove 21, the cathode gas passage groove 31, and the heat transmission medium passage grooves 26 and 36 are each comprised of linear portions extending horizontally and turn portions connecting adjacent linear portions. The number of grooves and the number of turn portions are not limited but may be suitably set so long as the advantages of the present invention are not impaired.

Figure 3:
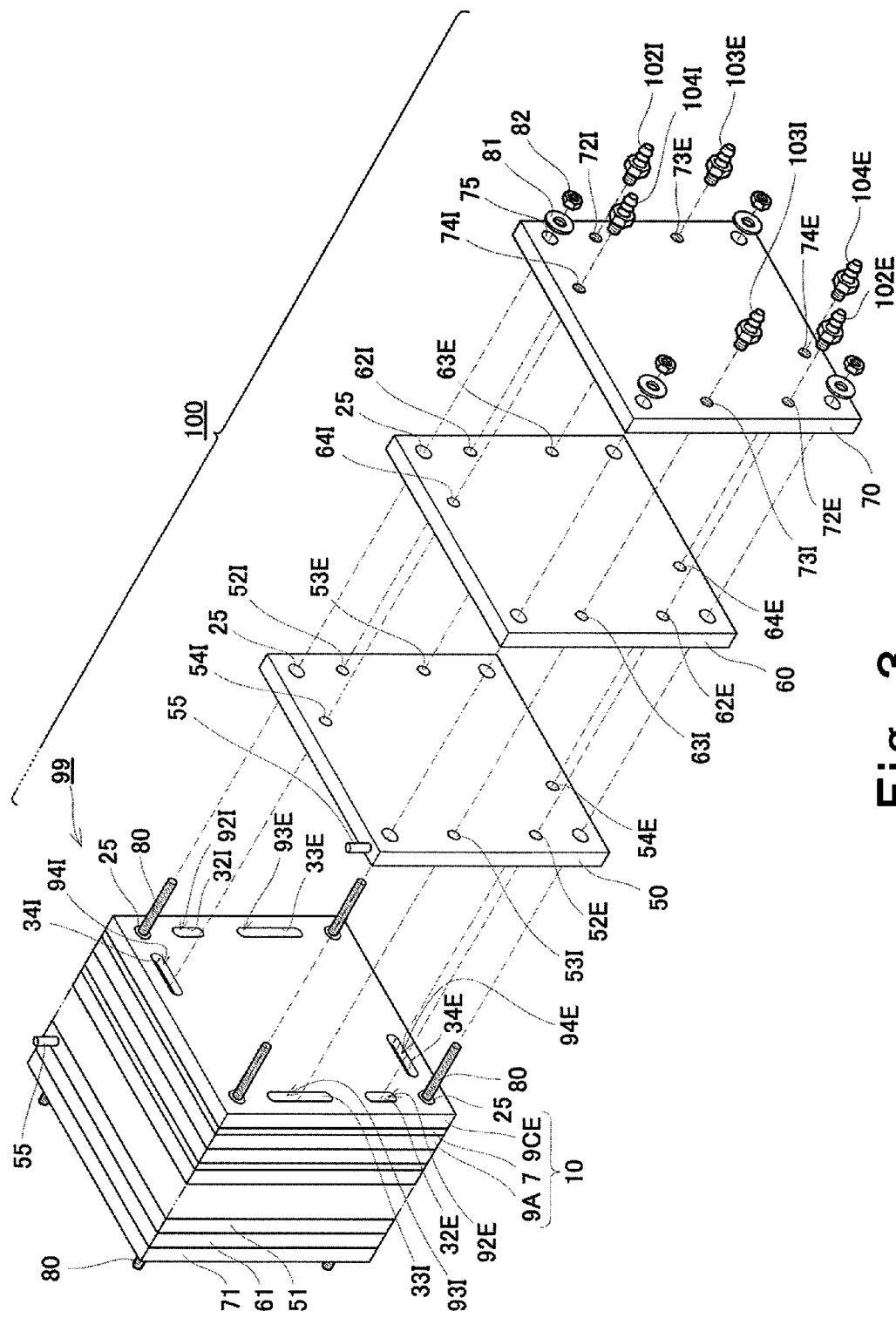
FIG. 3 is an exploded perspective view showing a structure of end portions of the stack of FIG. 1.

FIG. 3 is an exploded perspective view showing a structure of end portions of the stack of FIG. 1.

The stack 100 has a structure in which a pair of end members are disposed on outermost layers at both ends of the cell stack body 99 in which the cells 10 are stacked. To be specific, current collecting plates 50 and 51, insulating plates 60 and 61, and end plates 70 and 71, which have the same planar shape as that of the cells 10, are stacked on the outermost layers at both ends of the cells 10. Bolt holes 55, 65, and 75 are formed at four corners of the current collecting plates 50 and 51, the insulating plates 60 and 61, and the end plates 70 and 71.

The current collecting plates 50 and 51 are made of an electrically-conductive material such as copper metal and are respectively provided with terminals 55. The current collecting plate 50 is provided with holes penetrating a main surface thereof. To be specific, a first heat transmission medium flow hole 54I, a second heat transmission medium flow hole 54E, a first anode gas flow hole 52I, a second anode gas flow hole 52E, a first cathode gas flow hole 53I, and a second cathode gas flow hole 53E are formed to be connected to the first heat transmission medium manifold hole 34I, the second heat transmission medium manifold hole 34E, the first anode gas manifold hole 32I, the second anode gas manifold hole 32E, the first cathode gas manifold hole 33I, and the second cathode gas manifold hole 33E, respectively, of a cathode separator 9CE which contacts with the current collecting plate 50, i.e., the cathode separator 9CE forming one end surface of the stacked cells 10.

The insulating plates 60 and 61 and the end plates 70 and 71 are made of electrically-insulating materials. A first anode gas flow hole 62I, a second anode gas flow hole 62E, a first cathode gas flow hole 63I, a second cathode gas flow hole 63E, a first heat transmission medium flow hole 64I, and a second heat transmission medium flow hole 64E are formed on the insulating plate 60 to be connected to the flow holes 52I, 52E, 53I, 53E, 54I, and 54E formed on the current collecting plate 50, respectively. A first anode gas flow hole 72I, a second anode gas flow hole 72E, a first cathode gas flow hole 73I, a second cathode gas flow hole 73E, a first heat transmission medium flow hole 74I, and a second heat transmission medium flow hole 74E are formed on the end plate 70 to be connected to holes 62I, 62E, 63I, 63E, 64I, and 64E formed on the insulating plate 60, respectively. A first anode gas nozzle 102I, a second anode gas nozzle 102E, a first cathode gas nozzle 103I, a second cathode gas nozzle 103E, a first heat transmission medium nozzle 104I, and a second heat transmission medium nozzle 104E are attached to the flow holes 72I, 72E, 73I, 73E, 74I, and 74E on outer surface side of the end plate 70, respectively. As these nozzles, general connecting member connected with external pipe members are used. Although not shown, the current collecting plate 51, the insulating plate 61, and the end plate 71 have the same structure as the current collecting plate 50, the insulating plate 60, and the end plate 70 except that the flow holes are not provided on the current collecting plate 51, the insulating plate 61, and the end plate 71. Thus, inside the stack 100, for the anode gas, the cathode gas, and the heat transmission medium, passages are formed to allow the anode gas, the cathode gas, and the heat transmission medium to be flowed through the first flow holes 52I, 62I, 72I, 53I, 63I, 73I, 54I, 64I, and 74I and the first manifolds 92I, 93I, and 94I, branch from the first manifolds 92I, 93I and 94I to the passage grooves 21, 31, 26 and 36 in the cells 10 or between cells 10 and merge in the second manifolds 92E, 93E and 94E, and are flowed from the second manifolds 92E, 93E and 94E to the second flow holes 52E, 62E, 72E, 53E, 63E, 73E, 54E, 64E, and 74E.

The pair of end members and other members therebetween are fastened by fastening members. Herein, bolts 80 are inserted into the bolt holes 11, 25, 35, 55, 65, and 75 to penetrate the members between the both ends of the stack 100. Then, washers 81 and nuts 82 are attached to both ends of the bolts 80 so that the pair of end plates 70 and 71 and other members are fastened by the bolts 80, the washers 81 and the nuts 82, with a force of about 10 kgf/cm$^2$ per area of the separator.

It should be noted that the heat transmission medium passage groove 36 is not formed on the outer surface of the cathode separator 9CE forming one end surface of the stacked cells 10. Although not shown, the heat transmission medium passage groove 36 is not formed on the outer surface of the anode separator forming an opposite end surface.

Figure 4:
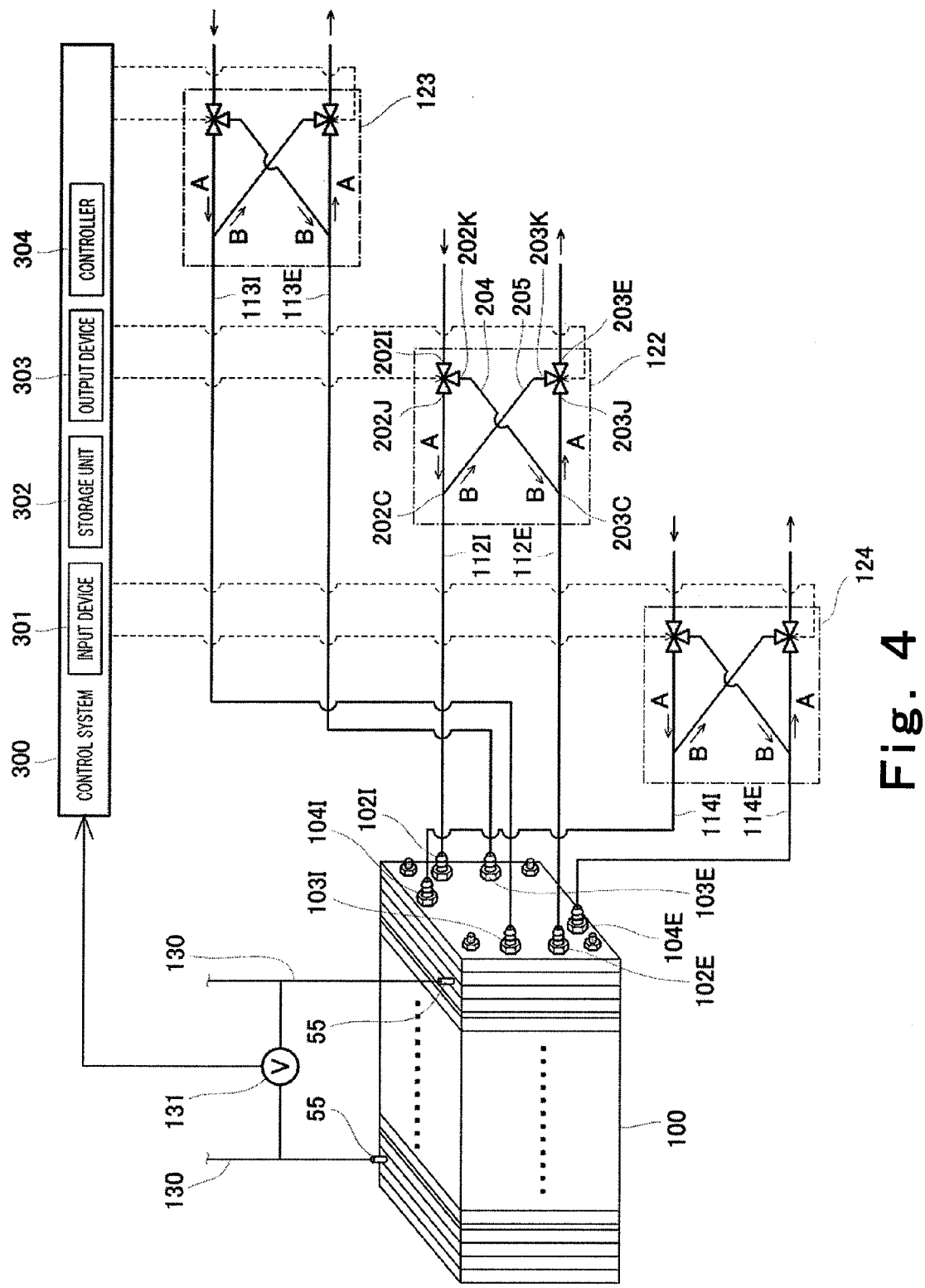
FIG. 4 is a view schematically showing a configuration of a fuel cell system of the first embodiment.

FIG. 4 is a view schematically showing a configuration of a fuel cell system according to a first embodiment.

A first anode gas pipe 112I is coupled to the first anode gas nozzle 102I of the stack 100, a second anode gas pipe 112E is coupled to the second anode gas nozzle 102E of the stack 100, a first cathode gas pipe 113I is coupled to the first cathode gas nozzle 103I of the stack 100, a second cathode gas pipe 113E is coupled to the second cathode gas nozzle 103E of the stack 100, a first heat transmission medium pipe 114I is coupled to the first heat transmission medium nozzle 104I of the stack 100, and a second heat transmission medium pipe 114E is coupled to the second heat transmission medium nozzle 104E of the stack 100.

An anode gas flow inverting device 122 is provided for the first anode gas pipe 112I and the second anode gas pipe 112E. A cathode gas flow inverting device 123 is provided for the first cathode gas pipe 113I and the second cathode gas pipe 113E. A heat transmission medium flow inverting device 124 is provided for the first heat transmission medium pipe 114I and the second heat transmission medium pipe 114E.

The anode gas flow inverting device 122, the cathode gas flow inverting device 123, and the heat transmission medium flow inverting device 124 (hereinafter collectively referred to as inverting devices) have the same configuration and are arranged for the first pipe and the second pipe. Therefore, as a representative of these inverting devices, the anode gas flow inverting device 122 will be described.

The anode gas flow inverting device 122 includes a pair of three-way valves 202W and 203W and a pair of branch passages 204 and 205. The three-way valve 202W is provided in the first anode gas pipe 112I and the three-way valve 203W is provided in the second anode gas pipe 112E. A branch portion 202C is provided in the first anode gas pipe 112I in a location between the three-way valve 202W and the first anode gas nozzle 102I. A branch passage 205 branches from the first anode gas pipe 112I at the branch portion 202C. A branch portion 203C is provided in the second anode gas pipe 112E in a location between the three-way valve 203W and the second anode gas nozzle 102E. A branch passage 204 branches from the second anode gas pipe 112E at the branch portion 203C. At the three-way valve 202W, a portion of the first anode gas pipe 112I on an anode gas supply source side is coupled to a first port 202I, a portion of the first anode gas pipe 112I on the first nozzle 102I side is coupled to a second port 202J, and the branch passage 204 is coupled to a third port 202K. At the three-way valve 203W, a portion of the second anode gas pipe 112E on an anode gas discharge end side is coupled to a first port 203E, a portion of the first anode gas pipe 112E on the second anode nozzle 102E side is coupled to a second port 203J, and the branch passage 205 is coupled to a third port 203K.

As indicated by an arrow A in FIG. 4, the three-way valve 202W is switched to connect the first port 202I to the second port 202J and the three-way valve 203W is switched to connect the first port 203E to the second port 203J. Thereby, a passage is formed within the inverting device 122 so that a fluid supplied from the first port 202I is flowed to the second port 202J and a fluid flowed from the second port 203J is discharged from the first port 203E (forward direction state). In this forward direction state, as indicated by an arrow B in FIG. 4, the three-way valve 202W is switched to connect the first port 202I to the third port 202K and the three-way valve 203W is switched to connect the first port 203E to the third port 203K. Thereby, a fluid supplied from the first port 202I is flowed to the second anode gas nozzle 102E through the branch passage 204 and the second anode gas pipe 112E, while a fluid discharged from the first anode gas nozzle 102I is discharged from the first port 203E through the first anode gas pipe 112I and the branch passage 205 (inverted state).

Although not shown, an anode gas supply system such as a reformer is coupled to a portion of the first anode gas pipe 112I which is closer to the anode gas supply source than the anode gas flow inverting device 122, and an anode gas treating system such as a combustor is coupled to a portion of the second anode gas pipe 112E which is closer to the anode gas discharge end than the anode gas flow inverting device 122. A cathode gas supply system such as a blower is coupled to a portion of the first cathode gas pipe 113I which is closer to the cathode gas supply source than the cathode gas flow inverting device 123. An exhaust system such as an exhaust tube is coupled to a portion of the second cathode gas pipe 113E which is closer to a cathode gas discharge end than the cathode gas flow inverting device 123. A circulating passage for heat transmission medium including a pump and a heat exchanger is coupled to a portion of the first heat transmission medium pipe 114I and a portion of the second heat transmission medium pipe 114E which are respectively closer to the heat transmission medium supply source and the heat transmission medium discharge end than the heat transmission medium flow inverting device 124.

An electricity output system 130 is coupled to terminals 55 of the stack 100. A voltage meter (voltage measuring device) 131 is coupled to the electricity output system 130 to measure a voltage between the terminals 55.

A signal output from the voltage meter 131 is sent to a control system 300.

The control system 300 includes an input device 301 constituted by a key board, a touch panel, and others, a storage unit 302 constituted by a memory and others, an output device 303 constituted by a monitor device, a printer, etc., and a controller 304 constituted by a CPU, a MPU, and others. The control system 300 is configured to obtain a signal of the voltage meter 131 and to control the anode gas flow inverting device 122, the cathode gas flow inverting device 123, and the heat transmission medium flow inverting device 124. The controller 304 includes a timer (time measuring device).

To be more specific, an inversion reference voltage (first inversion reference voltage) Vstand is input in advance with the input device 301 and is stored in the storage unit 302. The controller 304 compares an output voltage Vout measured by the voltage meter 131 to the inversion reference voltage Vstand and controls switching of the inverting devices 122, 123, and 124.

The inversion reference voltage Vstand can be predetermined based on a rated output voltage calculated from a rated electric load connected to the stack 100.

As used herein, the term "control system" is meant to include a control system group made up of a plurality of control systems which cooperate with each other to execute control, as well as a single control system. Therefore, the control system 300 need not consist of a single control system but may be a plurality of control systems which are distributed and cooperate with each other to be able to control the operations of the inverting devices 122, 123, and 124. For example, the output device 303 may be configured such that a mobile device displays information sent through an information terminal. The controller 304 may be provided for each of the inverting devices 122, 123, and 124.

Subsequently, an operation of the stack 100 configured in the above manner will be described.

Figure 5:
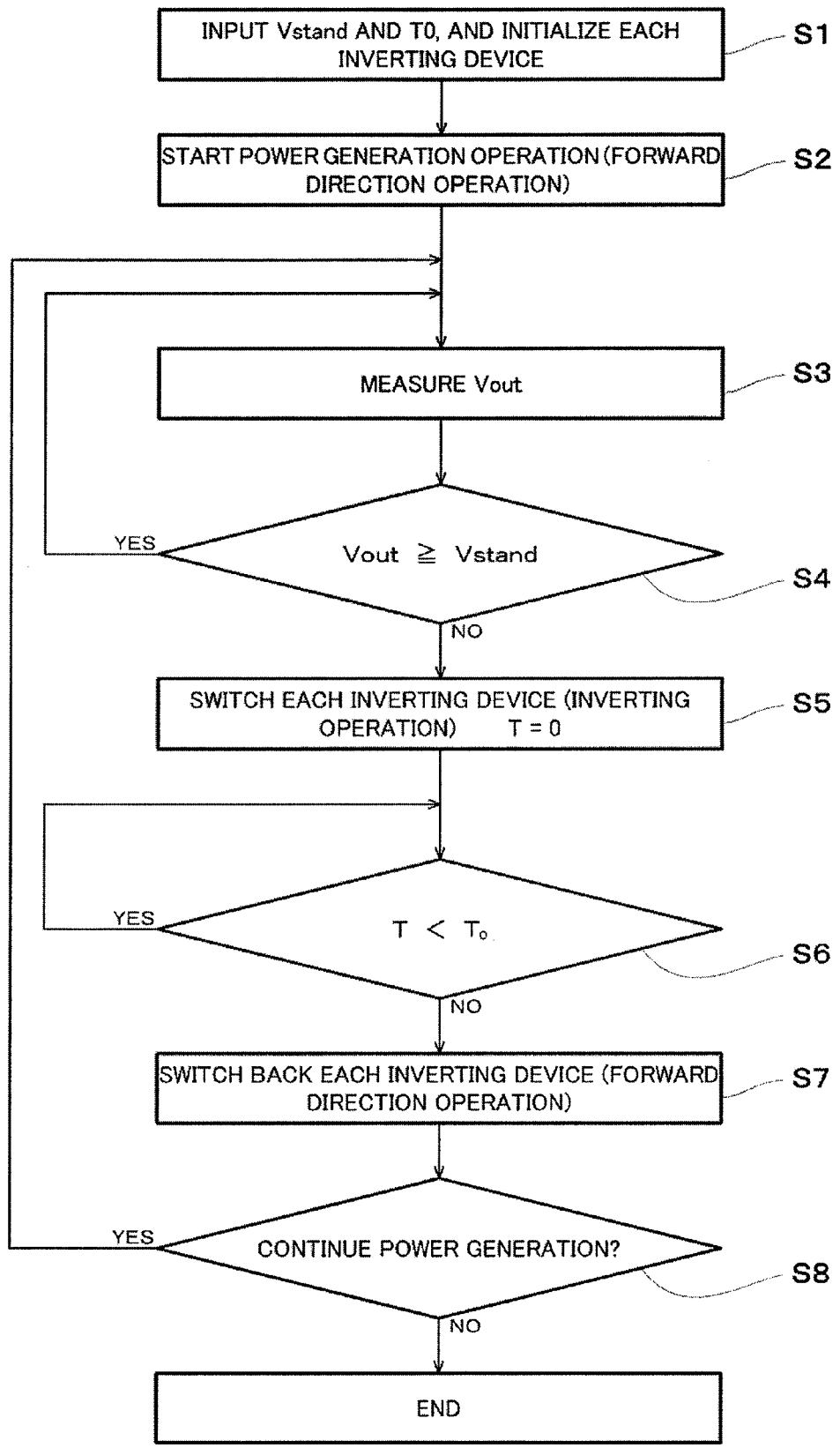
FIG. 5 is a flowchart showing an example of an operation of the fuel cell system of FIG. 4.

FIG. 5 is a flowchart showing an example of the operation of the fuel cell system of FIG. 4. The operations of at least the inverting devices 122, 123, and 124, in the operation of the fuel cell system, are carried out under control of the control system 300.

As shown in FIG. 5, initially, in step S1, inversion continuation time T0 and the inversion reference voltage Vstand are input to the control system 300. The inverting devices 122, 123, and 124 are each initialized to the forward direction state. The inversion continuation time T0 is a suitable time found out and set after repeated operation experiences of the fuel cell system of the present embodiment. To be specific, the inversion continuation time T0 is set depending on factors of the fuel cell system, such as the size of the stack 100, the shape of the stack 100, the flow rate of the anode gas or the cathode gas, or a speed of the anode gas or the cathode gas. For example, in general household fuel cell systems, the inversion continuation time T0 is suitably set to a time between about one hour to two hours.

In step S2, a power generation operation of the fuel cell system is started in the forward direction state (forward direction operation). Alternatively, after start of the power generation operation of the fuel cell system, the inversion reference voltage Vstand may be input with the input device 301.

Upon start of the power generation operation, as shown in FIG. 4, the anode gas from outside is flowed through the anode gas flow inverting device 122 and the first anode gas pipe 112I and is supplied to the stack 100 through the first anode gas nozzle 102. Likewise, the cathode gas from outside is flowed through the cathode gas flow inverting device 123 and the first cathode gas pipe 113I and is supplied to the stack 100 through the first cathode gas nozzle 103I. The heat transmission medium from outside is flowed through the heat transmission medium flow inverting device 124, and the first heat transmission medium pipe 114I and is supplied to the stack 100 through the first heat transmission medium nozzle 104I. In the present embodiment, water is used as the heat transmission medium. But, the heat transmission medium is not limited to the water so long as it is superior in chemical stability, flow property, and heat transmission property. For example, the heat transmission medium may be silicon oil. In one example, hydrogen gas which is the anode gas and air which is the cathode gas may be supplied to the stack 100 in a state where the hydrogen gas and the air have been humidified to a dew point of 70° C. and has a temperature of 70° C.

As shown in FIG. 1, the cathode gas within the first cathode gas manifold 93I is flowed into the cathode gas passage 31 of the cathode separator 9C and is flowed through the cell 10, and surplus cathode gas and a reaction product are flowed out to the second cathode gas manifold 93E. Likewise, the anode gas within the first anode gas manifold 92I is flowed into the anode gas passage 21 of the anode separator 9A and is flowed through the cell 10, and surplus anode gas is flowed out to the second anode gas manifold 92E.

As shown in FIG. 4, the anode gas within the second anode gas manifold 92E is flowed through the second anode gas flow holes 52E, 62E, and 72E, and the second anode gas nozzle 102E and is discharged to outside through the second anode gas pipe 112E and the anode gas flow inverting device 122. Likewise, the cathode gas within the second cathode gas manifold 93E is flowed through the second cathode gas flow holes 53E, 63E, and 73E, and the second cathode gas nozzle 103E and is discharged to outside through the second cathode gas pipe 113E and the cathode gas flow inverting device 123. The heat transmission medium is flowed through the second heat transmission medium flow holes 54E, 64E, and 74E and the second heat transmission medium nozzle 104E and is discharged to outside through the second heat transmission medium pipe 114E and the heat transmission medium flow inverting device 124.

During the power generation operation of the stack 100, the amount of water is increased because of accumulation of generated water in locations closer to the outlets 22E and 33E in the anode gas passage groove 21 and the cathode gas passage groove 31. The inlet-side region 21U, the inlet-side region 31U, and the inlet-side regions 26U and 36U (see FIGS. 1 and 2) of the anode gas passage groove 21, the cathode gas passage groove 31, and the heat transmission medium passage grooves 26 and 36 are located to substantially overlap with each other as viewed from the direction in which the cells 10 are stacked. Also, the outlet-side region 21L, the outlet-side region 31L, and the outlet-side regions 26L and 36L of the anode gas passage groove 21, the cathode gas passage groove 31, and the heat transmission medium passage grooves 26 and 36 are located to substantially overlap with each other as viewed from the direction in which the cells 10 are stacked. Therefore, during the power generation operation of the stack 100, the temperature of the fluid arises because of accumulation of reaction heat generated through an electrochemical reaction in locations closer to the outlets 22E, 33E, 24E and 34E of the anode gas passage groove 21, the cathode gas passage groove 31, and the heat transmission medium passage grooves 26 and 36. This allows relative humidity to be approximately 100% over the entire of the anode gas passage groove 21 and the cathode gas passage groove 31.

Subsequently, an inverting operation of the inverting devices 122, 123, and 124 which is a characteristic of the present invention will be described. The inverting operation is carried out under control of the control system 300.

As shown in FIG. 5, in step S3, after start of the power generation operation of the stack 100, the voltage meter 131 measures continuously or intermittently the output voltage Vout of the stack 100. In the case of an operating state of the fuel cell system in which the electric load of the electricity output system 130 fluctuates, the output voltage Vout may be a value at a time of a specified electric load. Alternatively, the control system 300 may be configured in such a manner that a current value at the terminal 55 is obtained using a current meter which is not shown and a voltage value of the voltage meter 131 at a time point of a current value which is a time point when the inversion reference voltage Vstand is determined is the output voltage Vout.

In step S4, the output voltage Vout is compared to the inversion reference voltage Vstand.

If the output voltage Vout≧ the inversion reference voltage Vstand, step S3 is repeated. That is, as indicated by the arrow A in FIG. 4, the inverting devices 122, 123, and 124 are maintained in the forward direction state.

On the other hand, if the output voltage Vout< the inversion reference voltage Vstand, the process advances to step S5 in which the inverting devices 122, 123, and 124 are switched to a reverse direction which is opposite to the forward direction. That is, if the state turns to the output voltage Vout< the inversion reference voltage Vstand as the operation time of the stack 100 lapses, the inverting devices 122, 123, and 124 are switched as indicated by the arrow B in FIG. 4. Thereby, the flow direction of the heat transmission medium, the flow direction of the anode gas, and the flow direction of the cathode gas in the stack 100 are inverted (this is referred to as an inverting operation). Then, the controller 304 initializes the timer (T=0), and re-starts measuring time.

Thus, the flow direction of the anode gas, the flow direction of the cathode gas, and the flow direction of the heat transmission medium within the stack 100 are inverted, according to deterioration of performance of the stack 100, inversion is made between the inlet-side regions 21U, 31U, 26U, and 36U and the outlet-side regions 21L, 31L, 26L, and 36L of these gases (see FIGS. 1 and 2). To be specific, during the inverting operation, the inlet-side regions 21U, 31U, and 36U are configured to substantially overlap with each other as viewed from the direction in which the cells 10 are stacked, as in during the forward direction operation, and the outlet-side regions 21L, 31L, and 36L are configured to substantially overlap with each other as viewed from the direction in which the cells 10 are stacked, as in during the forward direction operation. Therefore, in the stack 100 during the inverting operation, the temperature is higher in location closer to the inlets 22I and 33I, and the relative humidity in the anode gas passage groove 21 and the cathode gas passage groove 31 are substantially the same as in during the forward direction operation. This makes it possible to well obviate water clogging state within the stack 100 while suppressing damage to the polymer electrolyte membrane of the stack 100. Therefore, deterioration of performance of the stack 100 can be well prevented or the deteriorated performance can be well restored. In addition, deterioration of durability of the stack 100 can be suppressed.

In step S6, the inverting operation is continued until the measured time T of the timer reaches the inversion continuation time T0.

If the measured time T reaches the inversion continuation time T0, in step S7, the inverting devices 122, 123 and 124 are switched back to the forward direction operation.

In step S8, it is determined whether or not the power generation of the stack 100 should be continued. If it is determined that the power generation of the stack 100 should be continued, step S3 is repeated.

If it is determined whether or not the power generation of the stack 100 should not be continued in step S8, power generation stop operation of the stack 100 is started and the power generation operation of the stack 100 is terminated. It may be determined whether or not the power generation should be continued, based on various information obtained from respective components of the fuel cell system. It may be determined whether or not the power generation should be continued, for example, based on whether or not there is a command for stopping the power generation which is input with the input device 301, or information indicating that an electric power load is disconnected.

The start of the power generation operation in step S2 and the end of the power generation operation in step S8 may be replaced by whether or not there is a command for turning on and off the inverting operation which is input with the input device 301. In this manner, during the power generation operation of the stack 100, it may be determined whether or not an inverting operation control mode of the present invention should be executed, as desired.

Whereas in the first embodiment, switching back of the inverting devices 122, 123, and 124 is controlled in such a manner that the timer measures the time to restrict the continuation time of the inverting operation, the fuel cell system of the present invention may be configured using means other than the timer. For example, the fuel cell system of the present invention may be configured in such a manner that a flow rate meter is attached for at least one of the anode gas and the cathode gas and switching back control for the inverting devices 122, 123, and 124 is carried out at the time when the flow rate of the gas reaches a predetermined flow rate.

Since performance of the stack 100 is directly detected by measuring the output voltage Vout in the first embodiment, switching of the inverting devices 122, 123 and 124 can be accurately carried out. Alternatively, deterioration of performance of the stack 100 can be detected by utilizing parameters regarding the power generation operation of the stack 100. For example, it can be detected based on the power generation continuation time, a pressure loss in the anode gas passage groove 21 or the cathode gas passage groove 31 (pressure difference between regions of the passage).

(Embodiment 2)

In the fuel cell system according to a second embodiment of the present invention, the inverting devices 122, 123, and 124 are controlled according to the power generation continuation time of the stack 100.

Since the configuration of the fuel cell system of the second embodiment is such that the voltage meter 131 is omitted from the configuration of the fuel cell system of the first embodiment, and new components are not incorporated, it will not be further described.

Figure 6:
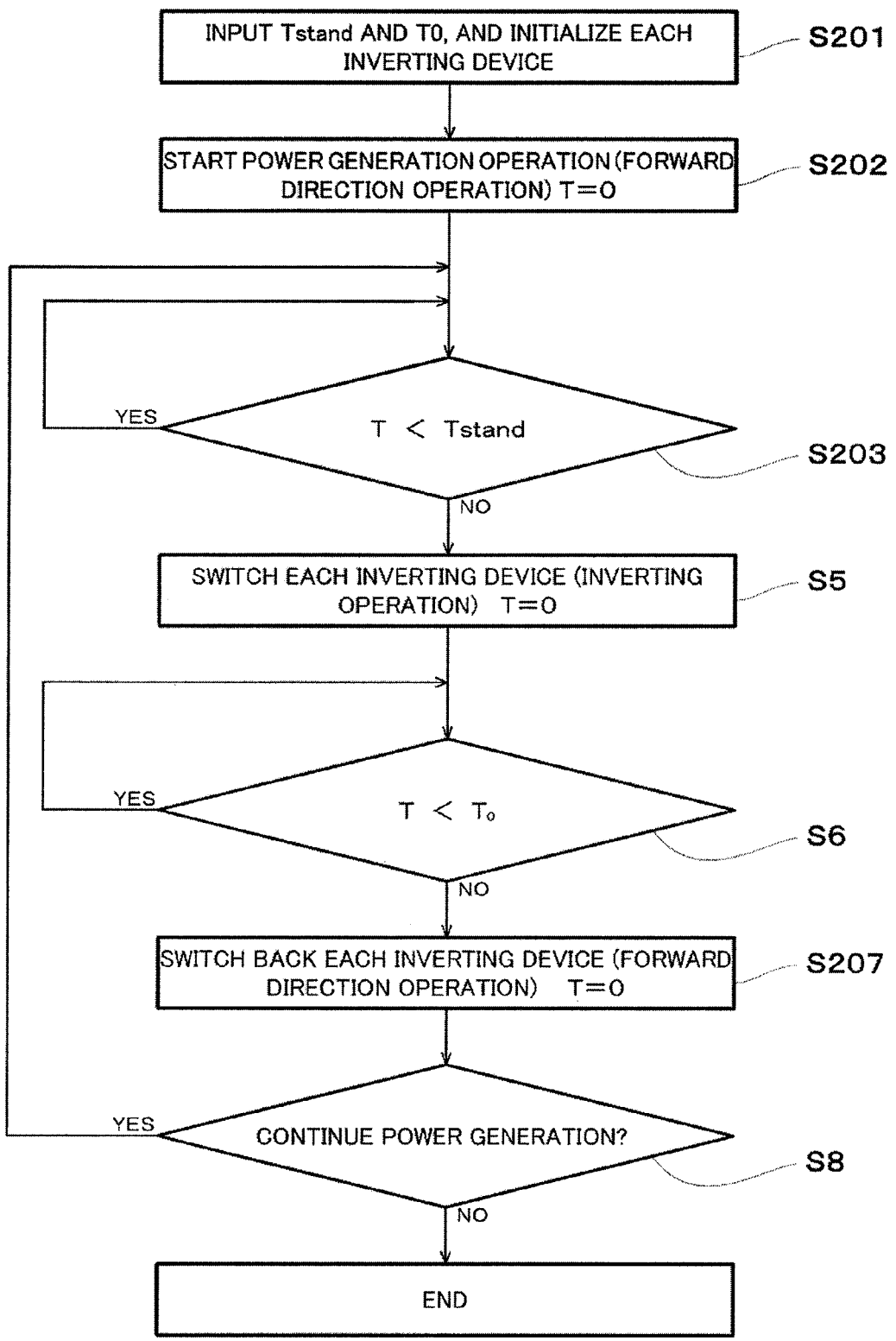
FIG. 6 is a flowchart showing an example of an operation of a fuel cell system according to a second embodiment.

FIG. 6 is a flowchart showing an example of the operation of the fuel cell system of the second embodiment. In FIG. 6, the same reference numerals as those in FIG. 5 denote the same or corresponding steps, which will not be further described. Hereinafter, a distinction between the first embodiment and the second embodiment will be described.

As shown in FIG. 6, initially, in step S201, the inversion continuation time T0 and the inversion reference time Tstand are input to the control system. The inversion reference time Tstand can be determined based on the relation between the power generation continuation time and a decrease phenomenon or an unstabilization phenomenon of the output voltage, which is obtained in advance in a durability test using the stack 100.

In step S202, the power generation operation of the fuel cell system is started in the forward direction state, and the controller 304 initializes the timer (T=0) and starts measuring time.

In step S203, the power generation operation is continued until the measured time T reaches the inversion reference time Tstand.

If the measured time T reaches the inversion reference time Tstand, steps S5 and S6 are performed as in the first embodiment, and the process advances to step S207.

In step S207, the inverting devices 122, 123 and 124 are switched back to the forward direction operation. To switch back them, the timer is initialized (T=0) and re-starts measuring time.

Then, the process advances to step S8.

In accordance with the present embodiment, in addition to the advantages of the first embodiment, the inverting devices 122, 123, and 124 can be switched to be preventive against the deterioration of performance of the stack 100. This enables the fuel cell system to carry out the power generation operation more stably. Because of the omission of the voltage meter 131, the configuration of the fuel cell system can be simplified.

(Embodiment 3)

In the fuel cell power generation system according to a third embodiment of the present invention, the inverting devices 122, 123, and 124 are controlled according to a pressure loss of the cathode gas in the cathode gas passage.

Figure 7:
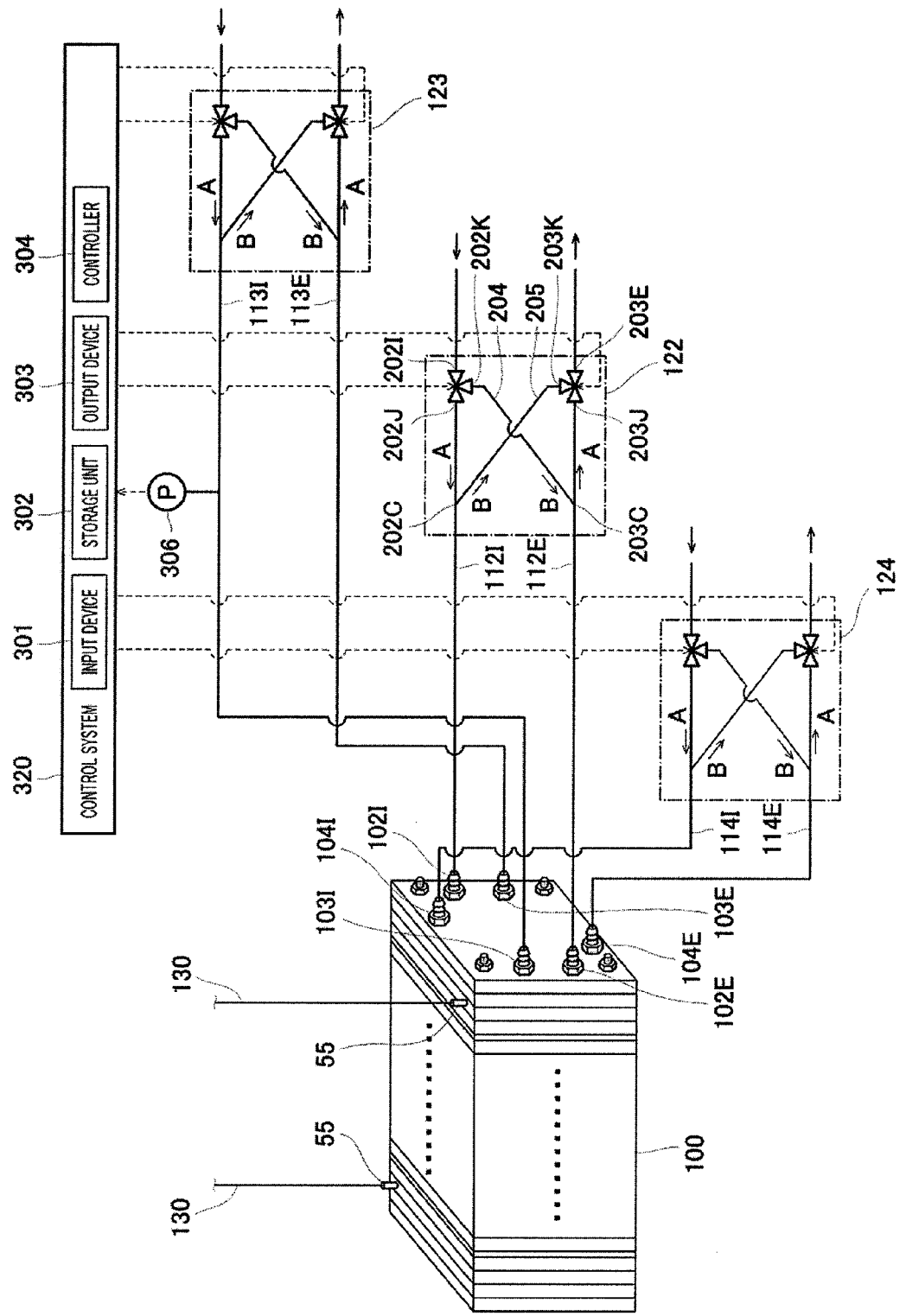
FIG. 7 is a view schematically showing a configuration of a fuel cell system according to a third embodiment.

FIG. 7 is a view schematically showing a configuration of the fuel cell system according to the third embodiment.

As shown in FIG. 7, the third embodiment of the present invention is identical to the first embodiment except that a control system 320 includes a pressure meter (pressure measuring device) 306 which measures a pressure in the first cathode gas pipe 113I, instead of the voltage meter 131. So, in FIG. 7, the same reference numerals as those in FIG. 4 denote the same or corresponding parts, which will not be further described. Hereinafter, a distinction between the first embodiment and the third embodiment will be described.

The pressure meter 306 measures a pressure P in the first cathode gas pipe 113I. In a general fuel cell system, during the power generation operation, a flow rate of the cathode gas supplied to the first cathode gas pipe 113I is maintained constant, and the second cathode gas pipe 113E opens in atmosphere at its downstream side in the flow direction of the cathode gas. Since the pressure loss at the downstream side of the second cathode gas pipe 113E is constant, the change in the pressure P is substantially based on the change in the pressure loss in the cathode gas passage groove 36 within the stack 100. The pressure loss increases as the pressure P is higher. So, the change in the pressure loss in the cathode gas passage groove 31 can be detected based on the change in the pressure P in the first cathode gas pipe 113I.

Figure 8:
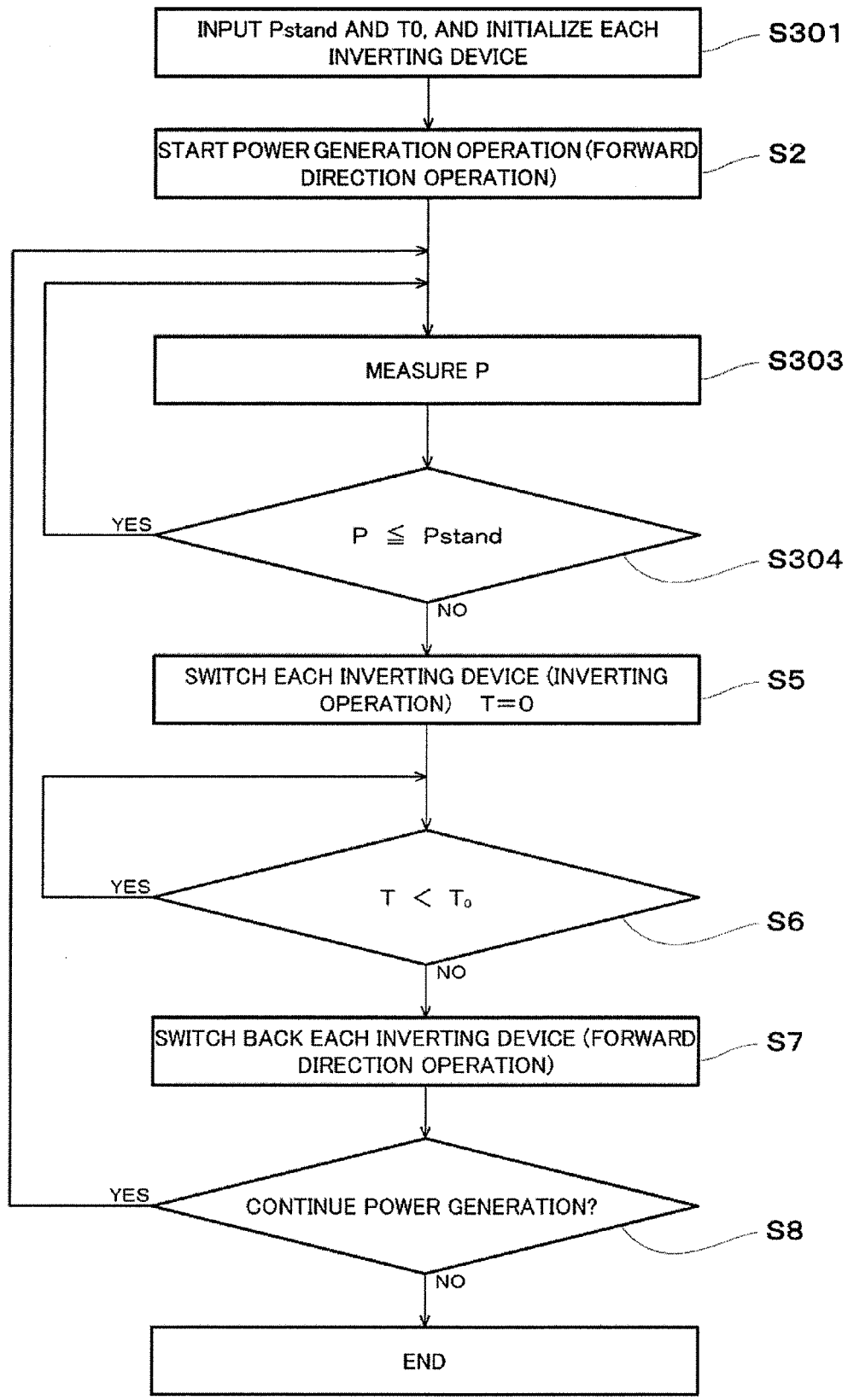
FIG. 8 is a flowchart showing an example of an operation of the fuel cell system according to the third embodiment.

FIG. 8 is a flowchart showing an example of the operation of the fuel cell system according to the third embodiment. In FIG. 8, the same reference numerals as those in FIG. 5 denote the same or corresponding steps, which will not be further described, and a distinction will be in large part described.

As shown in FIG. 8, initially, in step S301, the inversion continuation time T0 and the inversion reference pressure (first inversion reference pressure) Pstand are input to the control system. The inversion reference pressure Pstand can be determined based on the relation between the increase in the pressure P and a decrease phenomenon or an unstabilization phenomenon of the output voltage Vout, which is obtained in advance in a durability test using the stack 100. Through step S2, the process advances to step S303.

In step S303, after start of the power generation operation of the stack 100, the pressure meter 306 measures the pressure P continuously or intermittently.

In step S304, the measured pressure P is compared to the inversion reference pressure Pstand.

If the pressure P≦ the inversion reference pressure Pstand, step S3 is repeated. That is, as indicated by the arrow A in FIG. 7, the inverting devices 122, 123, and 124 are maintained in the forward direction state.

On the other hand, if the pressure P> the inversion reference pressure Pstand, the process advances to step S5 through step S8. Since the deterioration of performance of the stack 100 is detected according to an increase in the pressure loss in the cathode gas passage groove 31 or the anode gas passage groove 21 due to some causes such as flooding, the inverting devices 122, 123, and 124 are switched as indicated by the arrow B in FIG. 7, if the pressure P> the inversion reference pressure Pstand.

In accordance with the present embodiment, since it is not necessary to measure the output voltage Vout using the voltage meter, the switching of the inverting devices 122, 123, and 124 can be carried out accurately, while simplifying configuration of the fuel cell system.

In the third embodiment, alternatively, a pressure difference meter may be disposed to be able to measure a pressure difference between the first cathode gas pipe 113I and the second cathode gas pipe 113E instead of the pressure meter 306, and the control system 320 may be configured to obtain the pressure difference. This makes it possible to measure a change in the pressure loss in the cathode gas passage groove 31 within the stack 100 without being affected by a change in the pressure resistance at the downstream side of the second cathode gas pipe 113E. As a result, the switching of the inverting devices 122, 123, and 124 can be carried out more accurately.

In the third embodiment, furthermore, by measuring the pressure in the first anode gas pipe 112I or the pressure difference between the first anode gas pipe 112I and the second anode gas pipe 112E, the switching of the inverting devices 122, 123, and 124 can be carried out accurately.

Thus far, the embodiments of the present invention have been described. The passage patterns of the anode gas passage groove 21, the cathode gas passage groove 31 and the heat transmission medium passage grooves 26 and 36 in the first to third embodiments of the present invention may be such that the inlet-side regions 21U, 31U and 26U and 36U of these passages substantially overlap with each other and the outlet-side regions 21L, 31L, 26L and 36L of these passages substantially overlap with each other as viewed from the direction in which the cells 10 are stacked. For example, they may be configured as illustrated in a modification example 1.

MODIFICATION EXAMPLE 1

Figure 9:
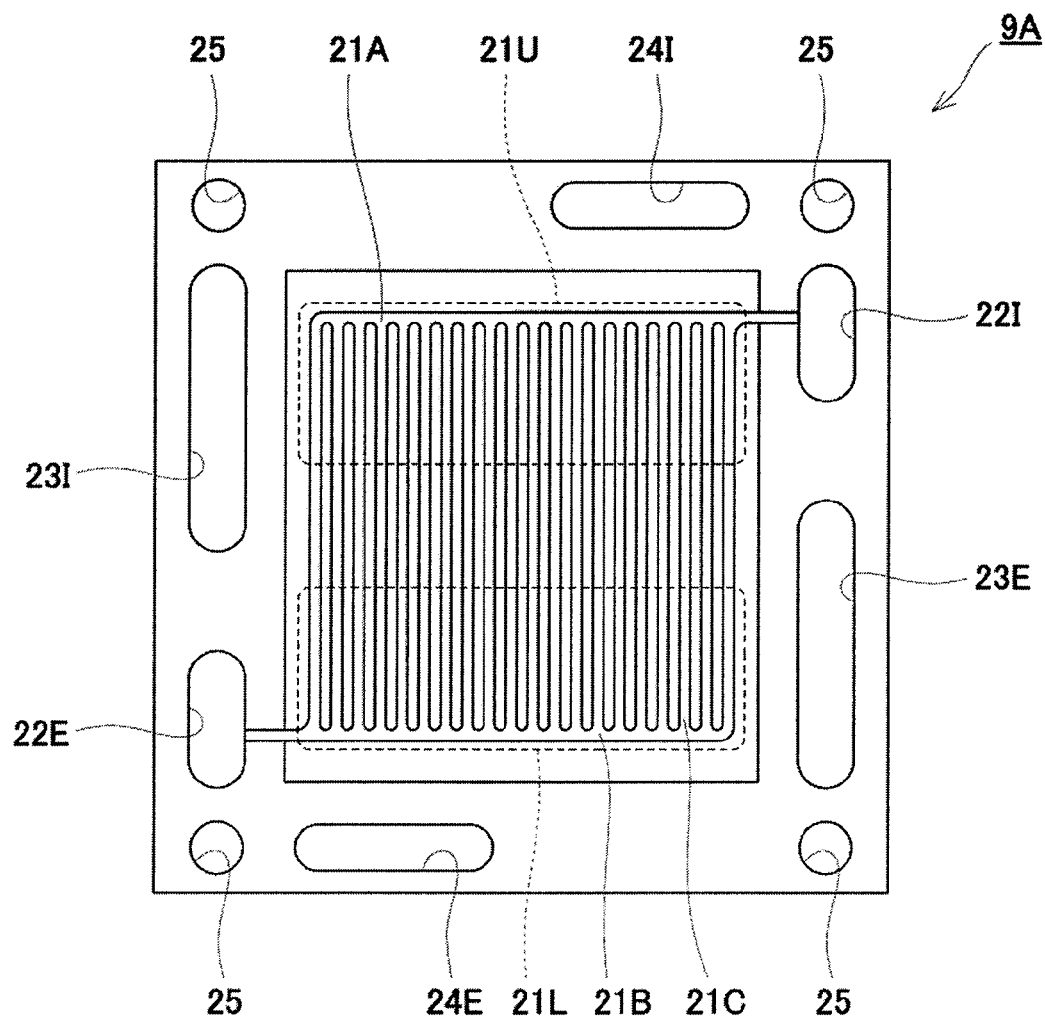
FIG. 9 is a plan view showing an example of an anode gas passage groove in a modification example 1.

FIG. 9 is a plan view showing an example of the anode gas passage groove of the modification example 1. As shown in FIG. 9, in the present modification example, the anode gas passage groove 21 of the anode separator 9A is formed to branch into plural passages, instead of the serpentine shape. To be specific, the anode gas passage groove 21 is formed to include main passage grooves 21A and 21B respectively extending from the first anode gas manifold hole 22I and the second manifold hole 22E and a plurality of branch passage grooves 21C connecting the pair of main passage grooves 21A and 21B.

The inlet-side region 21U and the outlet-side region 21L of the anode gas passage groove 21 are respectively located in an upper part and in a lower part in FIG. 8. The passages of the cathode gas passage groove 31, and the heat transmission medium passage grooves 26 and 36 have the same structure. Thereby, the inlet-side regions 21U, 31U and 26U and 36U substantially overlap with each other and the outlet-side regions 21L, 31L, and 26L and 36L substantially overlap with each other as viewed from the direction in which the cells 10 are stacked.

The inverting devices 122, 123, and 124 of the first to third embodiments of the present invention may be configured as in a modification example 2.

MODIFICATION EXAMPLE 2

Figure 10:
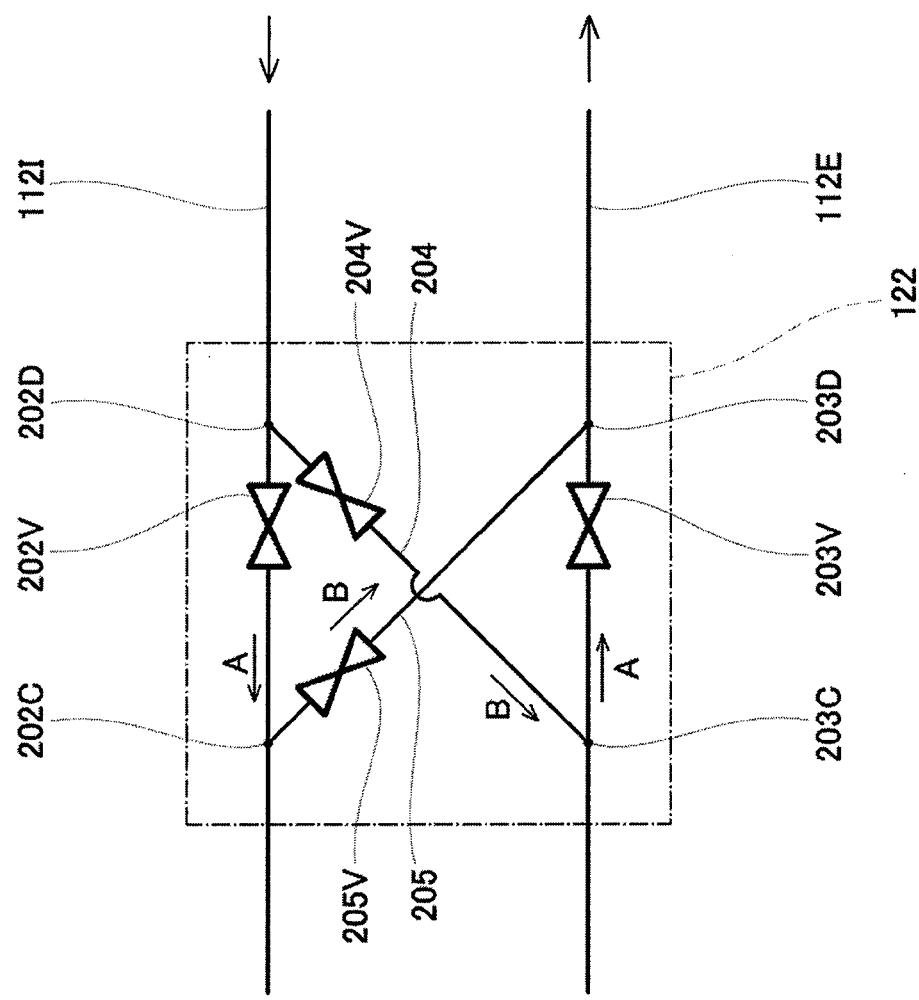
FIG. 10 is a view showing an example of an inverting device in a modification example 2.

FIG. 10 is a view showing an example of the inverting device according to a modification example 2. As shown in FIG. 10, in the present modification example, the three-way valve 202W and the three-way valve 203W in the anode gas flow inverting device 122 in FIG. 4 have been replaced by a branch portion 202D and a branch portion 203D, respectively. A valve 202V is provided in the first anode gas pipe 112I in a location between the branch portion 202D and the branch portion 202C, a valve 203V is provided in the second anode gas pipe 112E in a location between the branch portion 203D and the branch portion 203C, and a valve 204V and a valve 205V are provided in the branch passage 204 and the branch passage 205, respectively.

By opening the valve 202V and the valve 203V and by closing the valve 204V and the valve 205V, the forward direction state is formed as indicated by the arrow A in FIG. 9. By closing the valve 202V and the valve 203V and by opening the valve 204V and the valve 205V, the inverted state is formed as indicated by the arrow B in FIG. 9.

The stack 100 of the first to third embodiments of the present invention may be configured as illustrated in a modification example 3 below.

MODIFICATION EXAMPLE 3

Figure 11:
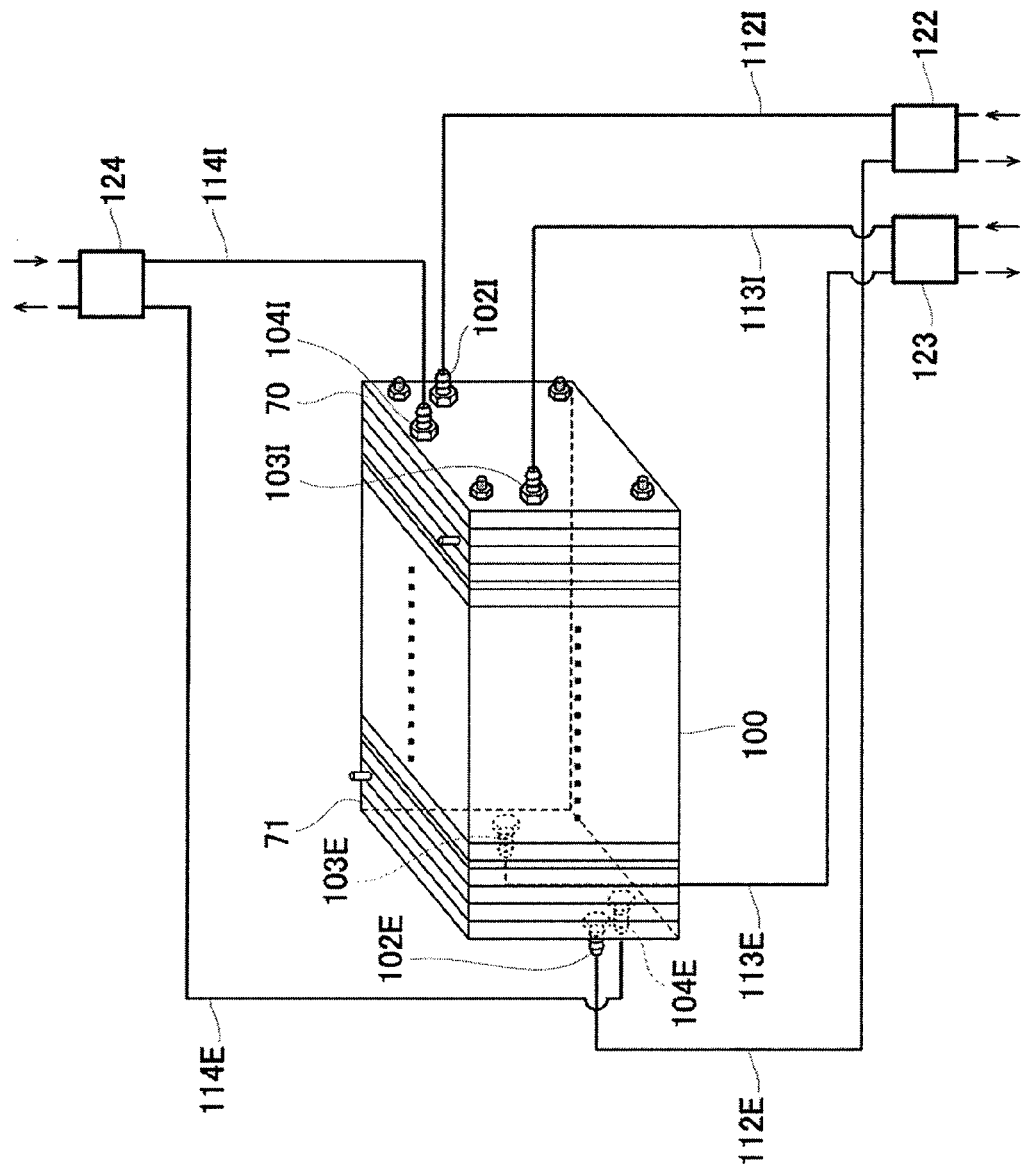
FIG. 11 is a view showing an example of a fuel cell stack in a modification example 3.

FIG. 11 is a view showing an example of a fuel cell stack according to the modification example 3. As shown in FIG. 11, in the present modification example, the first anode gas flow hole 72I, the first cathode gas passage flow hole 73I, and the first heat transmission medium flow hole 74I are formed on the end plate 70. The first anode gas nozzle 102I, the first cathode gas nozzle 103I, and the first heat transmission medium nozzle 104I are attached to the flow holes 72I, 73I, and 74I on the outer surface side of the end plate 70.

The second anode gas flow hole 72E, the second cathode gas flow hole 73E, and the second heat transmission medium flow hole 74E are formed on the end plate 71. The second anode gas nozzle 102E, the second cathode gas nozzle 103E, and the second heat transmission medium nozzle 104E are attached to the flow holes 72E, 73E, and 74E on the outer surface side of the end plate 70, respectively.

MODIFICATION EXAMPLE 4

In the first to third embodiments of the present invention, the flow direction of the anode gas and/or the cathode gas may be inverted and thereafter the flow direction of the heat transmission medium may be inverted. By inverting the flow direction(s) of the anode gas and/or the cathode gas without inverting the flow direction of the heat transmission medium, the anode gas and/or the cathode gas containing a less moisture are/is flowed under a temperature condition substantially equal to that in an uninverted state in the outlet-side region 21L and/or the outlet-side region 31L of the anode gas passage groove 21 and/or the cathode gas passage groove 31 in the uninverted state. Therefore, clogging state or narrowing state due to the moisture in these regions can be quickly obviated.

Figure 12:
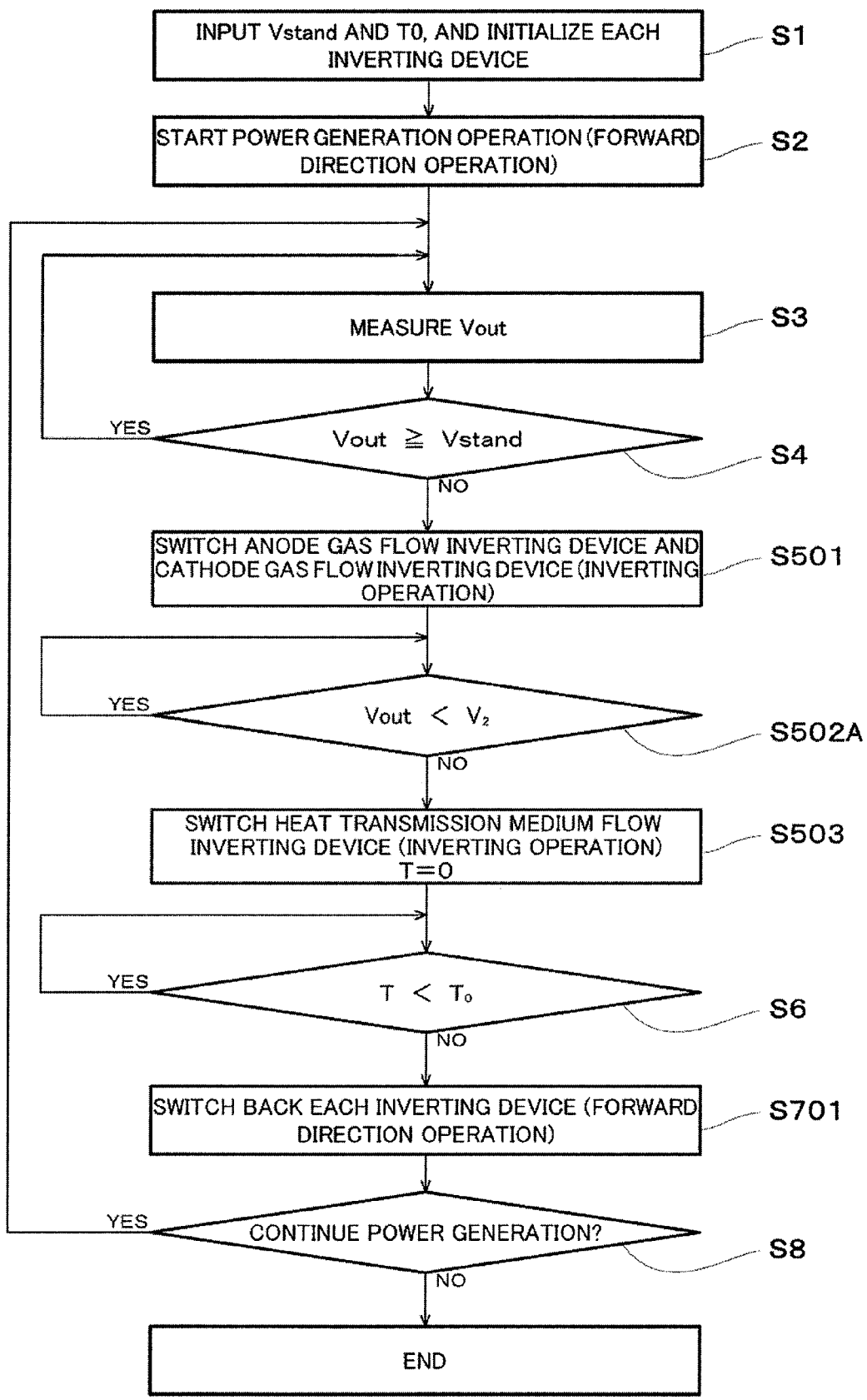
FIG. 12 is a flowchart showing an example of the operation of the fuel cell system of the present modification example in the first embodiment.

FIG. 12 is a flowchart showing an example of the operation of the fuel cell system according to the present modification example of the first embodiment. In FIG. 12, the same reference numerals as those in FIG. 5 denote the same or corresponding steps, which will not be further described, and a distinction will be in large part described.

With reference to FIG. 12, in step 501, the controller 304 controls inversion of only the anode gas flow inverting device 122 and the cathode gas flow inverting device 123. In step S502A, when the output voltage Vout measured by the voltage meter (voltage measuring device) 131 is the second inversion reference voltage V2 or higher, the process advances to step S503, in which the controller 304 controls the inversion of the heat transmission medium flow inverting device 124. Also, in step S503, the controller 304 initializes the timer (T=0) and re-starts measuring time. In such a configuration, since the performance of the fuel cell stack is directly detected, clogging state or narrowing state due to the moisture in these regions can be quickly obviated.

The second inversion reference voltage V2 is a voltage value set independently of the inversion reference voltage Vstand. The second inversion reference voltage V2 may be an arbitrary voltage value which is higher than the inversion reference voltage Vstand and is not higher than the output voltage of the stack 100 in a normal state in which the flooding does not occur in the anode gas passage groove 21 and the cathode gas passage groove 31.

Figure 13:
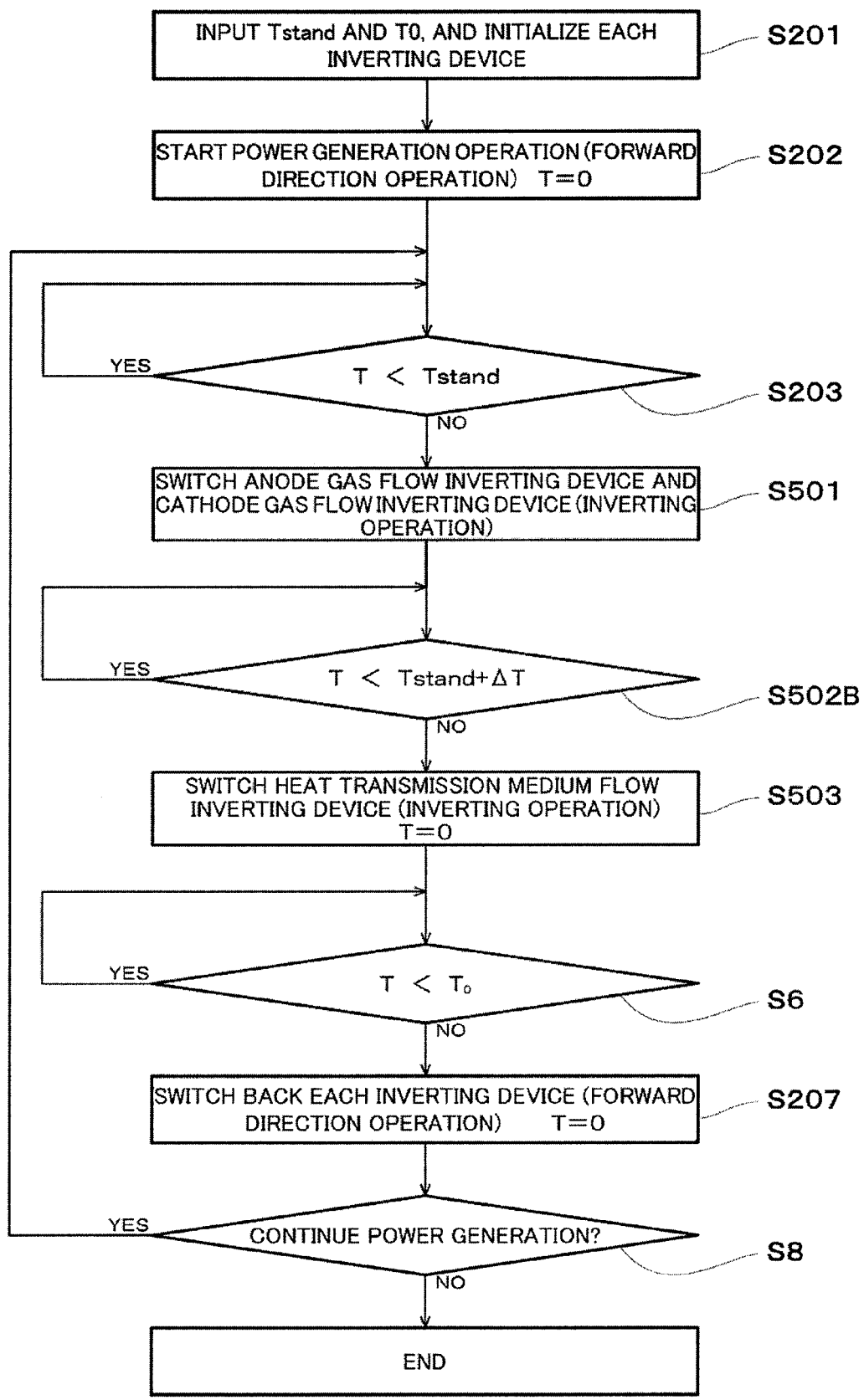
FIG. 13 is a flowchart showing an example of the operation of the fuel cell system of the present modification example in the second embodiment.

FIG. 13 is a flowchart showing an example of the operation of the fuel cell system according to the present modification example of the second embodiment. In FIG. 13, the same reference numerals as those in FIG. 6 denote the same or corresponding steps, which will not be further described, and a distinction will be in large part described.

With reference to FIG. 13, in step S501, the controller 304 controls the inversion of only the anode gas flow inverting device 122 and the cathode gas flow inverting device 123.

Then, when the time T measured by the timer (time measuring device) reaches the inversion reference time Tstand plus delay time ΔT in step S502B, the process advances to step S503 in which the controller 304 controls the inversion of the heat transmission medium flow inverting device 124. In step S503, the controller 304 initializes the timer (T=0) and re-starts measuring time. In such a configuration, because of omission of the voltage meter 131, the configuration of the fuel cell system can be further simplified.

The delay time ΔT may be set to a value which is sufficient to remove the water remaining in the anode gas passage groove 21 and the cathode gas passage groove 31.

To be more specific, the delay time ΔT may be determined based on the dew point of the cathode gas, the temperature of the stack 100 (to be precise, estimated temperature in the interior of the cathode gas passage groove 31), the flow rate of the cathode gas, and the volume of the cathode gas passage groove 31.

For example, in a case where the operation condition of the fuel cell system is such that the dew point of the cathode gas is 65° C., the temperature of the stack 100 (to be precise, estimated temperature in the interior of the cathode gas passage groove 31) is 70° C., and the flow rate of the cathode gas is 50 L/min, and a moisture content of the cathode gas is 13.2 $cm^3$/mn. When the temperature of the cathode gas is increased up to 70° C., then a possible moisture content is 17.9 $cm^3$/mn. Therefore, a difference of 4.7 $cm^3$/mn between them is a discharge capability for the moisture remaining in the cathode gas passage groove 31.

For example, assuming that the MEA contact surfaces 20 and 30 of the anode separator 9A and the cathode separator 9C are each 225 $cm^2$ (15 cm×15 cm), and the water remains in ⅓ of the entire of the cathode gas passage groove 31 of the cathode separator 9C, it may be estimated that the water remains in ⅓ (area of 75 $cm^2$) of the entire of the MEA contact surface 30 (area of 225 $cm^2$) of the cathode separator 9C. If the cathode gas passage groove 31 has a depth of 0.3 mm, it may estimated that the amount of water remaining in the cathode gas passage groove 31 is 2.25 $cm^3$. From the above, it may be estimated that the time which is sufficiently long to remove the water remaining in the cathode gas passage groove 31 is 2.25/4.7×60=28.7 sec. Therefore, the delay time ΔT=29 sec may be set.

In the above description, as a method of determining a ratio of the cathode gas passage groove 31 in which the water remains (⅓ of the entire of the cathode gas passage groove 31 in the above description), there is a method of observing the power generation output of the cathode. For example, when the power generation output is decreased to ⅔ of the power generation output in a steady state without abnormality, it may be determined that water remain in ⅓ of the entire of the cathode gas passage groove 31.

In the above description, (1) an example of a case where ΔT is determined assuming that the region where the water remains is the cathode passage groove 31 has been described. Alternatively, ΔT may be determined assuming that the region where the water remain is as described below.

For example, there will be described (2) a case where ΔT is determined assuming that the region where the water remains is an interior of the cathode electrode (e.g., interior of gas diffusion layer or catalyst layer) and (3) a case where ΔT is determined assuming that the region where the water remains is the cathode passage groove 31 and the interior of the cathode electrode of the MEA 5.

In the case of (2), for example, the delay time ΔT can be determined based on the dew point of the cathode gas, the temperature of the stack 100 (to be precise, estimated temperature in the interior of the cathode gas passage groove 31), the flow rate of the cathode gas, and the volume of all gaps in the interior of the cathode electrode in the MEA 5.

In the case of (3), for example, the delay time ΔT can be determined based on the dew point of the cathode gas, the temperature of the stack 100 (to be precise, estimated temperature in the interior of the cathode gas passage groove 31), the flow rate of the cathode gas, the volume of the cathode gas passage groove 31, and the volume of all gaps in the interior of the cathode electrode in the MEA 5.

Figure 14:
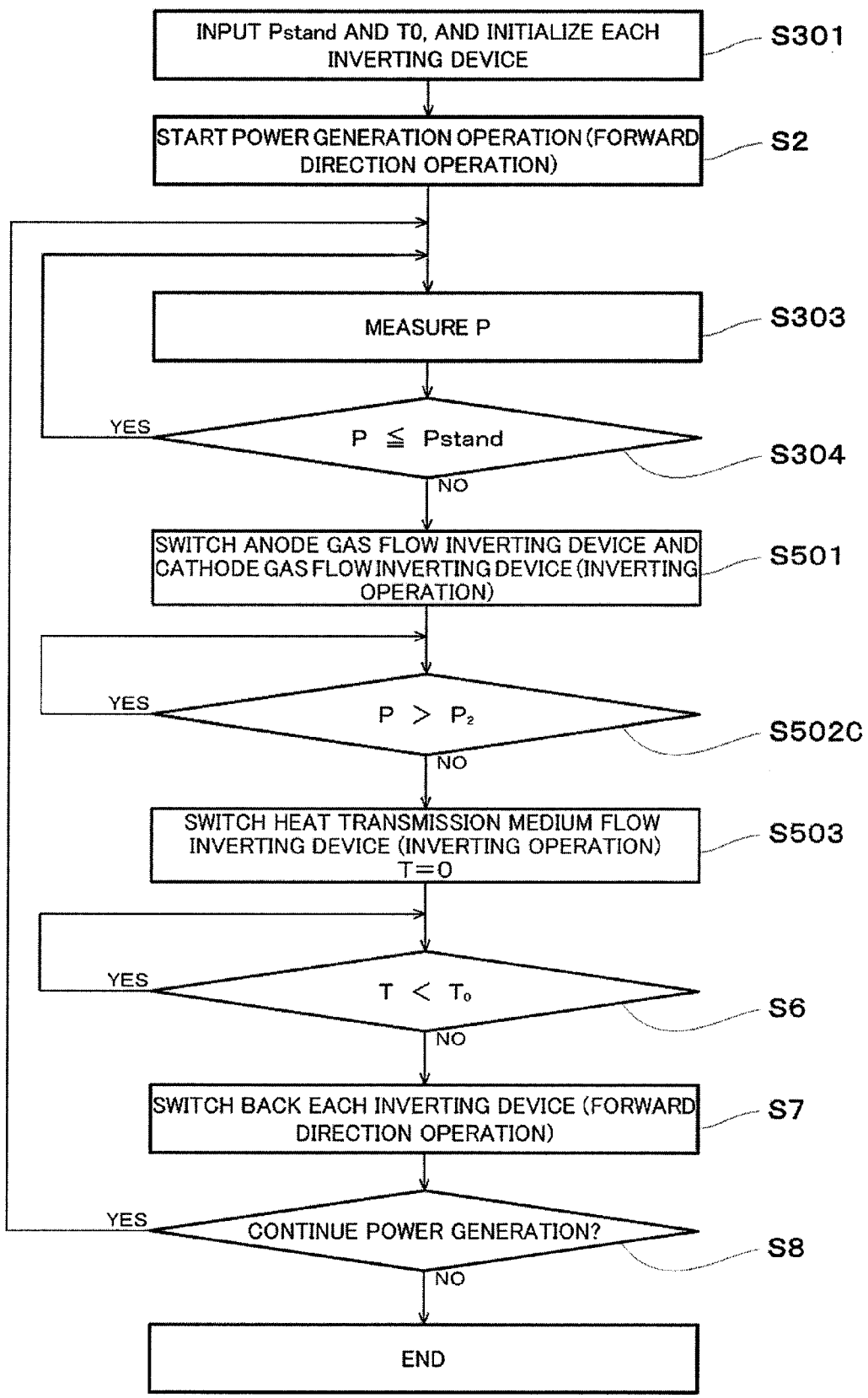
FIG. 14 is a flowchart showing an example of the operation of the fuel cell system of the present modification example in the third embodiment.

FIG. 14 is a flowchart showing an example of the operation of the fuel cell system according to the present modification example of the third embodiment. In FIG. 14, the same reference numerals as those in FIG. 8 denote the same or corresponding steps, which will not be further described, and a distinction will be in large part described.

With reference to FIG. 14, in step S501, the controller 304 controls the inversion of only the anode gas flow inverting device 122 and the cathode gas flow inverting device 123. In step S502C, when the pressure P measured by the pressure meter (pressure measuring device) 306 is the second inversion reference pressure P2 or lower, the process advances to step S503, in which the controller 304 controls the inversion of the heat transmission medium flow inverting device 124. Also, in step S503, the controller 304 initializes the timer (T=0) and re-starts measuring time. This makes it possible to simplify the configuration of the fuel cell system of the present invention. In addition, since the clogging state or the narrowing state due to the moisture in the anode gas passage groove 21 and/or the cathode gas passage groove 31 is directly detected, the clogging state or the narrowing state due to the moisture can be quickly obviated.

The second inversion reference pressure P2 is a voltage value set independently of the inversion reference pressure Pstand. The second inversion reference pressure P2 may be an arbitrary pressure value which is lower than the inversion reference pressure Pstand and is not lower than the pressure in the first cathode gas pipe 113I in a normal state in which the flooding does not occur in the anode gas passage groove 21 and the cathode gas passage groove 31.

Thus far, the embodiments and their modification examples of the present invention have been described, but the present invention is not intended to be limited to these embodiments and their modification examples.

Whereas in the present invention, the flow directions of the three fluids, namely, the anode gas, the cathode gas, and the heat transmission medium are inverted, similar advantages can be achieved by inverting the flow directions of the cathode gas and the heat transmission medium, or by inverting the flow directions of the anode gas and the heat transmission medium.

The configuration of the controller 304 in the control system 300, 310, or 320 may be simplified by inverting the flow directions of the anode gas, the cathode gas, and the heat transmission medium substantially at the same time.

The operation method of the fuel cell system of the present invention is able to be carried out even if the inverting devices 122, 123, and 124 are omitted. To be specific, when the deterioration of performance of the stack 100 is detected, for example, by using the voltage meter 131, the timer of the controller 304, or the pressure meter 306, supply of the anode gas and/or the cathode gas and supply of the heat transmission medium are stopped temporarily. Then, the first pipes 112I, 113I and 114I and the second pipes 112I, 113I and 114I are re-attached in an inverted state to the stack 100 and in this state, supply of the anode gas and/or the cathode gas and the heat transmission medium is re-started. In this manner, the operation method of the fuel cell system of the present invention can be carried out.

The inverting devices 122, 123, and 124 may be constituted by general pipe inverting devices.

In the first and third embodiments, step 7 for switching back the inverting operation to the forward direction operation may be performed as in step S5. That is, step S7 may be performed based on the output voltage of the fuel cell, or the pressure loss in the anode gas passage or the cathode gas passage. In a further alternative, in the second embodiment, the inversion continuation time T0=the inversion reference voltage Tstand may be set.

The switching back operation in step S7 may be performed as in the operation in step S501, steps S502A to S502C and step S503. To be specific, after control of re-inversion of one of the anode gas flow inverting device and the cathode gas flow inverting device, re-inversion of the heat transmission medium flow inverting device may be controlled based on the output voltage of the fuel cell, the pressure loss in the anode gas passage or the cathode gas passage, or time difference. In this case, in the third embodiment, it is necessary to incorporate the pressure meter 306 to be able to measure the pressure in the second cathode gas pipe 113E.

INDUSTRIAL APPLICABILITY

The present invention is useful as a fuel cell system capable of well preventing deterioration of performance a fuel cell stack or well restoring deteriorated performance of the fuel cell stack and of suppressing deterioration of durability of the fuel cell stack, and an operation method of the fuel cell system.

The invention claimed is:

1. A fuel cell system including:
   unit cells each having an MEA, a pair of an anode separator plate and a cathode separator plate which are disposed to sandwich said MEA, an anode gas passage which is provided between said MEA and said anode separator plate to connect an anode gas inlet to an anode gas outlet, and a cathode gas passage which is provided between said MEA and said cathode separator plate to connect a cathode gas inlet to a cathode gas outlet; and
   a fuel cell stack having said unit cells stacked and being provided with a heat transmission medium passage which is provided between surfaces of said stacked unit cells to connect a heat transmission medium inlet to a heat transmission medium outlet;
   wherein said anode gas passage, said cathode gas passage, and said heat transmission medium passage have a structure in which inlet-side regions of said anode gas passage, said cathode gas passage, and said heat transmission medium passage substantially overlap with each other and outlet-side regions of said anode gas passage, said cathode gas passage, and said heat transmission medium passage substantially overlap with each other as viewed from a direction in which said unit cells are stacked, and the anode gas, the cathode gas, and the heat transmission medium are flowed in a forward direction from the anode gas inlet to the anode gas outlet in said anode gas passage, from the cathode gas inlet to the cathode gas outlet in said cathode gas passage, and from the heat transmission medium inlet to the heat transmission medium outlet in said heat transmission medium passage, respectively; said fuel cell system comprising:
   at least one of an anode gas flow inverting device for inverting a flow direction of the anode gas in said anode gas passage from the forward direction to a reverse direction which is opposite to the forward direction, and a cathode gas flow inverting device for inverting a flow direction of the cathode gas in said cathode gas passage from the forward direction to the reverse direction;
   a heat transmission medium flow inverting device for inverting a flow direction of the heat transmission medium in said heat transmission medium passage from the forward direction to the reverse direction;
   a control system configured to control inversion of said heat transmission medium flow inverting device after controlling inversion of at least one of said anode gas flow inverting device and said cathode gas flow inverting device, according to deterioration of said fuel cell stack; and
   a voltage measuring device for measuring an output voltage of said fuel cell stack;
   wherein said control system is configured to control the inversion of said heat transmission medium flow inverting device based on the output voltage measured by said voltage measuring device, after controlling the inversion of at least one of said anode gas flow inverting device and said cathode gas flow inverting device;
   wherein said control system is configured to control the inversion of at least one of said anode gas flow inverting device and said cathode gas flow inverting device when the output voltage is lower than a first inversion reference voltage, and to control the inversion of said heat transmission medium flow inverting device when the output voltage is not lower than a second inversion reference voltage, after controlling the inversion of at least one of said anode gas flow inverting device and said cathode gas flow inverting device; and
   wherein the second inversion reference voltage has a voltage value higher than a voltage value of the first inversion reference voltage.

2. The fuel cell system according to claim 1, further comprising:
   a voltage measuring device for measuring an output voltage of said fuel cell stack;
   wherein said control system is configured to control the inversion of at least one of said anode gas flow inverting device and said cathode gas flow inverting device, and the inversion of said heat transmission medium flow inverting device, based on said output voltage.

3. The fuel cell system according to claim 1, further comprising:
   a time measuring device for measuring a power generation continuation time of said fuel cell stack;
   wherein said control system is configured to control the inversion of at least one of said anode gas flow inverting device and said cathode gas flow inverting device, and the inversion of said heat transmission medium flow inverting device, based on said power generation continuation time.

4. The fuel cell system according to claim 1, further comprising:
   a pressure measuring device for measuring a pressure loss in at least one of the anode gas in said anode gas passage and the cathode gas in said cathode gas passage;
   wherein said control system is configured to control the inversion of at least one of said anode gas flow inverting device and said cathode gas flow inverting device, and inversion of said heat transmission medium flow inverting device, based on said pressure loss.

5. A fuel cell system including:

unit cells each having an MEA, a pair of an anode separator plate and a cathode separator plate which are disposed to sandwich said MEA, an anode gas passage which is provided between said MEA and said anode separator plate to connect an anode gas inlet to an anode gas outlet, and a cathode gas passage which is provided between said MEA and said cathode separator plate to connect a cathode gas inlet to a cathode gas outlet: and a fuel cell stack having said unit cells stacked and being provided with a heat transmission medium passage which is provided between surfaces of said stacked unit cells to connect a heat transmission medium inlet to a heat transmission medium outlet;

wherein said anode gas passage, said cathode gas passage, and said heat transmission medium passage have a structure in which inlet-side regions of said anode gas passage, said cathode gas passage, and said heat transmission medium passage substantially overlap with each other and outlet-side regions of said anode gas passage, said cathode gas passage, and said heat transmission medium passage substantially overlap with each other as viewed from a direction in which said unit cells are stacked, and the anode gas, the cathode gas, and the heat transmission medium are flowed in a forward direction from the anode gas inlet to the anode gas outlet in said anode gas passage, from the cathode gas inlet to the cathode gas outlet in said cathode gas passage, and from the heat transmission medium inlet to the heat transmission medium outlet in said heat transmission medium passage, respectively; said fuel cell system comprising:

at least one of an anode gas flow inverting device for inverting a flow direction of the anode gas in said anode gas passage from the forward direction to a reverse direction which is opposite to the forward direction, and a cathode gas flow inverting device for inverting a flow direction of the cathode gas in said cathode gas passage from the forward direction to the reverse direction;

a heat transmission medium flow inverting device for inverting a flow direction of the heat transmission medium in said heat transmission medium passage from the forward direction to the reverse direction;

a control system configured to control inversion of said heat transmission medium flow inverting device after controlling inversion of at least one of said anode gas flow inverting device and said cathode gas flow inverting device, according to deterioration of said fuel cell stack; and a time measuring device;

wherein said control system is configured to control the inversion of said heat transmission medium flow inverting device according to an elapsed time measured by said time measuring device, after controlling the inversion of at least one of said anode gas flow inverting device and said cathode gas flow inverting device; and wherein a delay time that elapses from when the inversion of at least one of said anode gas flow inverting device and said cathode gas flow inverting device is controlled until the inversion of said heat transmission medium flow inverting device is controlled is determined based on a dew point of the cathode gas, a temperature of said cathode gas passage, a flow rate of the cathode gas, and a volume of said cathode gas passage.

6. A fuel cell system including:

unit cells each having an MEA, a pair of an anode separator plate and a cathode separator plate which are disposed to sandwich said MEA, an anode gas passage which is provided between said MEA and said anode separator plate to connect an anode gas inlet to an anode gas outlet, and a cathode gas passage which is provided between said MEA and said cathode separator plate to connect a cathode gas inlet to a cathode gas outlet; and a fuel cell stack having said unit cells stacked and being provided with a heat transmission medium passage which is provided between surfaces of said stacked unit cells to connect a heat transmission medium inlet to a heat transmission medium outlet;

wherein said anode gas passage, said cathode gas passage, and said heat transmission medium passage have a structure in which inlet-side regions of said anode gas passage, said cathode gas passage, and said heat transmission medium passage substantial overlap with each other and outlet-side regions of said anode gas passage, said cathode gas passage, and said heat transmission medium passage substantially overlap with each other as viewed from a direction in which said unit cells are stacked, and the anode gas, the cathode gas, and the heat transmission medium are flowed in a forward direction from the anode gas inlet to the anode gas outlet in said anode gas passage, from the cathode gas inlet to the cathode gas outlet in said cathode gas passage, and from the heat transmission medium inlet to the heat transmission medium outlet in said heat transmission medium passage, respectively; said fuel cell system comprising:

at least one of an anode gas flow inverting device for inverting a flow direction of the anode gas in said anode gas passage from the forward direction to a reverse direction which is opposite to the forward direction, and a cathode gas flow inverting device for inverting a flow direction of the cathode gas in said cathode gas passage from the forward direction to the reverse direction;

a heat transmission medium flow inverting device for inverting a flow direction of the heat transmission medium in said heat transmission medium passage from the forward direction to the reverse direction;

a control system configured to control inversion of said heat transmission medium flow inverting device after controlling inversion of at least one of said anode gas flow inverting device and said cathode gas flow inverting device, according to deterioration of said fuel cell stack; and a pressure measuring device for measuring a pressure loss in at least one of the anode gas in said anode gas passage and the cathode gas in said cathode gas passage;

wherein said control system is configured to control the inversion of said heat transmission medium flow inverting device based on the pressure loss measured by said pressure measuring device, after controlling the inversion of at least one of said anode gas flow inverting device and said cathode gas flow inverting device; and wherein said control system is configured to control the inversion of at least one of said anode gas flow inverting device and said cathode gas flow inverting device, when the pressure loss is higher than a first inversion reference pressure, and to control the inversion of said heat transmission medium flow inverting device when the pressure loss is not higher than a second inversion reference pressure after controlling the inversion of at least one of said anode gas flow inverting device and said cathode gas flow inverting device;

wherein the second inversion reference pressure is lower than the first inversion reference pressure.

7. A method of operating a fuel cell system including:

unit cells each having an MEA, a pair of an anode separator plate and a cathode separator plate which are disposed to sandwich said MEA, an anode gas passage which is provided between said MEA and said anode separator plate to connect an anode gas inlet to an anode gas outlet, and a cathode gas passage which is provided between said MEA and said cathode separator plate to connect a cathode gas inlet to a cathode gas outlet; and a fuel cell stack having said unit cells stacked and being provided with a heat transmission medium passage which is provided between surfaces of said stacked unit cells to connect a heat transmission medium inlet to a heat transmission medium outlet;

wherein said anode gas passage, said cathode gas passage, and said heat transmission medium passage have a structure in which inlet-side regions of said anode gas passage, said cathode gas passage, and said heat transmission medium passage substantially overlap with each other and outlet-side regions of said anode gas passage, said cathode gas passage, and said heat transmission medium passage substantially overlap with each other as viewed from a direction in which said unit cells are stacked, and the anode gas, the cathode gas, and the heat transmission medium are flowed in a forward direction from the anode gas inlet to the anode gas outlet in said anode gas passage, from the cathode gas inlet to the cathode gas outlet in said cathode gas passage, and from the heat transmission medium inlet to the heat transmission medium outlet in said heat transmission medium passage, respectively; said method comprising:

inverting a flow direction of the heat transmission medium in said heat transmission medium passage from the forward direction to a reverse direction which is opposite to the forward direction, after inverting at least one of a flow direction of the anode gas in said anode gas passage and a flow direction of the cathode gas in said cathode gas passage from the forward direction to the reverse direction.

8. The method of operating the fuel cell system according to claim 7, wherein at least one of the flow direction of the anode gas in said anode gas passage and the flow direction of the cathode gas in said cathode gas passage, and the flow direction of the heat transmission medium in said heat transmission medium passage, are inverted from their respective forward direction to their respective reverse direction which are opposite to their respective forward direction, based on an output voltage of said fuel cell stack.

9. The method of operating the fuel cell system according to claim 7, wherein at least one of the flow direction of the anode gas in said anode gas passage and the flow direction of the cathode gas in said cathode gas passage, and the flow direction of the heat transmission medium in said heat transmission medium passage are inverted from their respective forward direction to their respective reverse direction which are opposite to their respective forward direction, based on a power generation continuation time of said fuel cell stack.

10. The method of operating the fuel cell system according to claim 7, wherein at least one of the flow direction of the anode gas in said anode gas passage and the flow direction of the cathode gas in said cathode gas passage, and the flow direction of the heat transmission medium in said heat transmission medium passage are inverted from their respective forward direction to their respective reverse direction which are opposite to their respective forward direction, based on a pressure loss in at least one of the anode gas in said anode gas passage and the cathode gas in said cathode gas passage.

11. The method of operating the fuel cell system according to claim 7, wherein at least one of the flow direction of the anode gas in said anode gas passage and the flow direction of the cathode gas in said cathode gas passage is inverted from their respective forward direction to their respective reverse direction, then the flow direction of the heat transmission medium in said heat transmission medium passage is inverted from the forward direction thereof to the reverse direction thereof which is opposite to the forward direction thereof based on an output voltage of said fuel cell stack.

12. The method of operating the fuel cell system according to claim 11, wherein at least one of the flow direction of the anode gas in said anode gas passage and the flow direction of the cathode gas in said cathode gas passage is inverted from their respective forward direction to their respective reverse direction when the output voltage is lower than a first inversion reference voltage, then the flow direction of the heat transmission medium in said heat transmission medium passage is inverted from the forward direction thereof to the reverse direction thereof which is opposite to the forward direction thereof when the output voltage is not lower than a second inversion reference voltage, and wherein the second inversion reference voltage has a voltage value higher than a voltage value of the first inversion reference voltage.

13. The method of operating the fuel cell system according to claim 7, wherein at least one of the flow direction of the anode gas in said anode gas passage and the flow direction of the cathode gas in said cathode gas passage is inverted from their respective forward direction to their respective reverse direction, then the flow direction of the heat transmission medium in said heat transmission medium passage is inverted from the forward direction thereof to the reverse direction thereof which is opposite to the forward direction thereof according to an elapsed time.

14. The method of operating the fuel cell system according to claim 13, wherein a delay time that elapses from when at least one of the flow direction of the anode gas and the flow direction of the cathode gas is inverted until the flow direction of the heat transmission medium is inverted is determined based on a dew point of the cathode gas, a temperature of said cathode gas passage, a flow rate of the cathode gas, and a volume of said cathode gas passage.

15. The method of operating the fuel cell system according to claim 7, wherein at least one of the flow direction of the anode gas in said anode gas passage and the flow direction of the cathode gas in said cathode gas passage is inverted from their respective forward direction to their respective reverse direction, then the flow direction of the heat transmission medium in said heat transmission medium passage is inverted from the forward direction thereof to the reverse direction thereof which is opposite to the forward direction thereof based on a pressure loss in at least one of the anode gas in said anode gas passage and the cathode gas in said cathode gas passage.

16. The method of operating the fuel cell system according to claim 15, wherein at least one of the flow direction of the anode gas in said anode gas passage and the flow direction of the cathode gas in said cathode gas passage is inverted from their respective forward direction to their respective reverse direction when the pressure loss is higher than a first inversion reference pressure, then the flow direction of the heat transmission medium in said heat transmission medium passage is inverted from the forward direction thereof to the reverse direction thereof which is opposite to the forward direction thereof when the pressure loss is not higher than a second inversion reference pressure, and wherein the second inversion reference pressure is lower than the first inversion reference pressure.

* * * * *